(12) United States Patent
Huang et al.

(10) Patent No.: US 7,368,163 B2
(45) Date of Patent: **\*May 6, 2008**

(54) POLYMER SURFACE MODIFICATION

(75) Inventors: Jiang Huang, San Jose, CA (US);
Shoujun Xiao, Foster City, CA (US);
Marc A. Unger, South San Francisco, CA (US)

(73) Assignee: Fluidigm Corporation, South San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 11/304,316

(22) Filed: Dec. 14, 2005

(65) Prior Publication Data

US 2006/0093836 A1    May 4, 2006

Related U.S. Application Data

(63) Continuation of application No. 10/118,467, filed on Apr. 5, 2002, now Pat. No. 7,005,493.

(60) Provisional application No. 60/281,929, filed on Apr. 6, 2001.

(51) Int. Cl.
*B32B 3/26* (2006.01)
*B32B 9/04* (2006.01)

(52) U.S. Cl. ............. 428/304.4; 428/178; 428/308.4; 428/315.5; 428/447; 528/31; 528/32

(58) Field of Classification Search ............. None
See application file for complete search history.

(56) References Cited

U.S. PATENT DOCUMENTS

| | | |
|---|---|---|
| 3,570,515 A | 3/1971 | Kinner |
| 3,747,628 A | 7/1973 | Holster et al. |
| 4,046,159 A | 9/1977 | Pegourie |
| 4,119,368 A | 10/1978 | Yamazaki |
| 4,153,855 A | 5/1979 | Feingold |
| 4,245,673 A | 1/1981 | Bouteille et al. |
| 4,434,704 A | 3/1984 | Surjaatmadja |
| 4,760,114 A | 7/1988 | Haaf et al. |
| 4,898,582 A | 2/1990 | Faste |
| 4,992,312 A | 2/1991 | Frisch |
| 5,085,562 A | 2/1992 | Van Lintel |
| 5,088,515 A | 2/1992 | Kamen |
| 5,096,388 A | 3/1992 | Weinberg |
| 5,126,115 A | 6/1992 | Fujita et al. |
| 5,164,558 A | 11/1992 | Huff et al. |
| 5,171,132 A | 12/1992 | Miyazaki |
| 5,224,843 A | 7/1993 | Van Lintel |
| 5,259,737 A | 11/1993 | Kamisuki et al. |
| 5,265,327 A | 11/1993 | Faris et al. |
| 5,290,240 A | 3/1994 | Horres, Jr. |
| 5,336,062 A | 8/1994 | Richter |
| 5,346,372 A | 9/1994 | Naruse et al. |
| 5,375,979 A | 12/1994 | Trah |
| 5,376,252 A | 12/1994 | Ekstrom |
| 5,400,741 A | 3/1995 | DeTitta et al. |
| 5,423,287 A | 6/1995 | Usami et al. |
| 5,529,465 A | 6/1996 | Zengerle et al. |
| 5,593,130 A | 1/1997 | Hansson et al. |
| 5,635,578 A | 6/1997 | Arai et al. |
| 5,642,015 A | 6/1997 | Whitehead et al. |
| 5,659,171 A | 8/1997 | Young et al. |
| 5,660,370 A | 8/1997 | Webster |
| 5,681,024 A | 10/1997 | Lisec et al. |
| 5,683,800 A | 11/1997 | Stringfield et al. |
| 5,683,916 A | 11/1997 | Goffe et al. |
| 5,705,018 A | 1/1998 | Hartley |
| 5,759,014 A | 6/1998 | Van Lintel |
| 5,775,371 A | 7/1998 | Pan et al. |
| 5,788,468 A | 8/1998 | Dewa et al. |
| 5,836,750 A | 11/1998 | Cabuz |
| 5,842,787 A | 12/1998 | Kopf-Sill et al. |
| 5,875,817 A | 3/1999 | Carter |
| 5,876,187 A | 3/1999 | Afromowitz |
| 5,885,470 A | 3/1999 | Parce et al. |
| 5,932,799 A | 8/1999 | Moles |
| 5,942,443 A | 8/1999 | Parce et al. |
| 6,007,309 A | 12/1999 | Hartley |

(Continued)

FOREIGN PATENT DOCUMENTS

| | | |
|---|---|---|
| EP | 0 592 094 A2 | 4/1994 |
| EP | 0 703 364 A1 | 3/1996 |
| EP | 0 706 004 A2 | 4/1996 |
| EP | 0 779 436 A2 | 6/1997 |
| EP | 0 829 360 A2 | 3/1998 |
| EP | 0 845 603 A1 | 6/1998 |
| EP | 0 999 055 A2 | 5/2000 |
| GB | 2 155 152 A | 9/1985 |
| GB | 2 308 460 A | 6/1997 |
| WO | WO 98/07069 A1 | 2/1998 |

(Continued)

OTHER PUBLICATIONS

"Biochips," Nature Biotechnology, vol. 18, Supplement 2000, pp. IT43-IT44, 2000.
"Chapter 9: Microfluidic Devices," Micromachined Transducers Sourcebook, pp. 779-882, 1998.
"Last Chance For Micromachines," The Economist Technology Quarterly, 8 pages, Dec. 7, 2000.

(Continued)

*Primary Examiner*—Marc S. Zimmer
(74) *Attorney, Agent, or Firm*—Townsend and Townsend and Crew LLP

(57) ABSTRACT

The present invention is directed to a surface modified polymer comprising a surface which is covalently bonded to a surface modifying compound. Formation of the covalent bond between the polymer and the surface modifying compound is achieved by a reaction between an intrinsic functional group that is present in the polymer and the functional group of the surface modifying compound. By using a polymer having an intrinsic functional group, a separate surface activation step is avoided.

24 Claims, 15 Drawing Sheets

U.S. PATENT DOCUMENTS

| | | | |
|---|---|---|---|
| 6,043,080 | A | 3/2000 | Lipshutz et al. |
| 6,123,769 | A | 9/2000 | Sanjoh |
| 6,155,282 | A | 12/2000 | Zachary et al. |
| 6,174,365 | B1 | 1/2001 | Sanjoh |
| 6,274,089 | B1 | 8/2001 | Chow et al. |
| 6,296,673 | B1 | 10/2001 | Santarsiero et al. |
| 6,345,502 | B1 | 2/2002 | Tai et al. |
| 6,384,171 | B1 * | 5/2002 | Yamazaki et al. ............ 528/15 |
| 6,409,832 | B2 | 6/2002 | Weigl et al. |
| 6,503,359 | B2 * | 1/2003 | Virtanen ..................... 156/310 |
| 6,660,367 | B1 * | 12/2003 | Yang et al. ................. 428/188 |
| 6,767,706 | B2 | 7/2004 | Quake et al. |
| 7,005,493 | B2 * | 2/2006 | Huang et al. ................. 528/25 |
| 2001/0027745 | A1 | 10/2001 | Weigl et al. |
| 2002/0037499 | A1 | 3/2002 | Quake et al. |
| 2002/0160139 | A1 | 10/2002 | Huang et al. |

FOREIGN PATENT DOCUMENTS

| | | |
|---|---|---|
| WO | WO 99/00655 A2 | 1/1999 |
| WO | WO 99/04361 A1 | 1/1999 |
| WO | WO 99/17093 A1 | 4/1999 |
| WO | WO 99/52633 A1 | 10/1999 |
| WO | WO 00/00678 A1 | 1/2000 |
| WO | WO 00/43748 A1 | 7/2000 |
| WO | WO 00/60345 A1 | 10/2000 |
| WO | WO 01/09595 A2 | 2/2001 |
| WO | WO 01/09595 A3 | 2/2001 |

OTHER PUBLICATIONS

Ahn, Chong H. et al., "Fluid Micropumps Based On Rotary Magnetic Actuators," Proceedings of 1995 IEEE Micro Electro Mechanical Systems Workshop (MEMS '95), Amsterdam, Netherlands, pp. 408-412, Jan. 29-Feb. 2, 1995.
Anderson, Rolfe C. et al., "Microfluidic Biochemical Analysis System," Transducers '97, 1997 International Conference on Solid-State Sensors and Actuators, Chicago, Illinois, pp. 477-480, Jun. 16-19, 1997.
Angell, James B. et al., "Silicon Micromechanical Devices," Scientific American, pp. cover, 44-55, Apr. 1983.
Armani, Deniz et al., "Re-Configurable Fluid Circuits By PDMS Elastomer Micromachining," IEEE Int. Conf. Micro Electro Mech. Syst. Tech. Digest, vol. 12, pp. 222-227, 1999.
Ballantyne, J. P. et al., "Selective Area Metallization By Electron-Beam Controlled Direct Metallic Deposition," J. Vac. Sci. Technol., vol. 10, No. 6, pp. 1094-1097, Nov. 1973.
Benard, W. L. et al., "A Titanium-Nickel Shape-Memory Alloy Actuated Micropump," Transducers '97, 1997 International Conference on Solid-State Sensors and Actuators, Chicago, Illinois, pp. 361-364, Jun. 16-19, 1997.
Black, Harvey, "Tiny Technology Promises Tremendous Profits," The Scientist, vol. 15, No. 21, 4 pages, Oct. 29, 2001.
Bloomstein, T. M. et al., "Laser-Chemical Three-Dimensional Writing For Microelectromechanics And Applications To Standard-Cell Microfluidics," J. Vac. Sci. Technol. B, vol. 10, No. 6, pp. 2671-2674, November 1992.
Bousse, Luc et al., "Electrokinetically Controlled Microfluidic Analysis Systems," Annu. Rev. Biophys. Biomol. Struct., vol. 29, pp. 155-181, 2000.
Brechtel, R. et al., "Control Of The Electroosmotic Flow By Metal-Salt-Containing Buffers," Journal of Chromatography A, vol. 716, pp. 97-105, 1995.
Bryzek, Janusz et al., "Micromachines On The March", IEEE Spectrum, vol. 31, No. 5, pp. 20-31, May 1994.
Buchaillot, Lionel et al., "Silicon Nitride Thin Films Young's Modulus Determination By An Optical Non Destructive Method," Jpn. J. Appl. Phys., vol. 36, Part 2, No. 6B, pp. L794-L797, Jun. 15, 1997.
Calkins, Kathryn, "Mycometrix: Rubber Chips," BioCentury, 2 pages, Oct. 16, 2000.

Chaikof, Elliot L. et al., "ESCA Studies Of Cross-Linked Poly(ethylene Oxide)/Polysiloxane Networks," Journal of Colloid and Interface Science, vol. 137, No. 2, pp. 340-349, Jul. 1990.
Chiu, Daniel T. et al., "Patterned Deposition Of Cells And Proteins Onto Surfaces By Using Three-Dimensional Microfluidic Systems," PNAS, vol. 97, No. 6, pp. 2408-2413, Mar. 14, 2000.
Chou, Hou-Pu et al., "A Microfabricated Device For Sizing And Sorting DNA Molecules," Proc. Natl. Acad. Sci., vol. 96, pp. 11-13, Jan. 1999.
Chou, Hou-Pu et al., "A Microfabricated Rotary Pump," Biomedical Microdevices, vol. 3, No. 4, pp. 323-330, 2001.
Chou, Hou-Pu et al., "Integrated Elastomer Fluidic Lab-On-A-Chip-Surface Patterning And DNA Diagnostics," Proceedings of the Solid State Actuator and Sensor Workshop, Hilton Head, South Carolina, 4 pages, 2000.
Chou, Hou-Pu et al., "Multiple Disease Diagnostics On A Single Chip," Biophysics Lab, Caltech, pp. 1-4, Mar. 1, 2000.
Delamarche, Emmanuel et al., "Patterned Delivery Of Immunoglobulins To Surfaces Using Microfluidics Networks," Science, vol. 276, pp. 779-781, May 2, 1997.
Duffy, David C. et al., "Patterning Electroluminescent Materials With Feature Sizes As Small As 5 μm Using Elastomeric Membranes As Masks For Dry Lift-Off," Advanced Materials, vol. 11, No. 7, pp. 546-552, 1999.
Duffy, David C. et al., "Rapid Prototyping Of Microfluidic Switches In Poly(dimethyl siloxane) And Their Actuation By Electro-Osmotic Flow," J. Micromech. Microeng., vol. 9, pp. 211-217, 1999.
Duffy, David C. et al., "Rapid Prototyping Of Microfluidic Systems In Poly(dimethylsiloxane)," Analyitcal Chemistry, vol. 70, No. 23, pp. 4974-4984, Dec. 1, 1998.
Effenhauser, Carlo S. et al., "Integrated Capillary Electrophoresis On Flexible Silicone Microdevices: Analysis Of DNA Restriction Fragments And Detection Of Single DNA Molecules On Microchips," Analytical Chemistry, vol. 69, No. 17, pp. 3451-3457, Sep. 1, 1997.
Effenhauser; Carlo S. et al., "Integrated Chip-Based Capillary Electrophoresis," Electrophoresis, vol. 18, pp. 2203-2213, 1997.
Emoto, Kazunori et al., "Stability Of Poly(ethylene glycol) Graft Coatings," Langmuir, vol. 14, No. 10, pp. 2722-2729, 1998.
Eyal, Shulamit et al., "Velocity-Independent Microfluidic Flow Cytometry," Electrophoresis, vol. 23, pp. 2653-2657, 2002.
Fahrenberg, J. et al., "A Microvalve System Fabricated By Thermoplastic Molding," J. Micromech. Microeng., vol. 5, pp. 169-171, 1995.
Fettinger, J. C. et al., "Stacked Modules For Micro Flow Systems In Chemical Analysis: Concept And Studies Using An Enlarged Model," Sensors and Actuators B, vol. 17, pp. 19-25, 1993.
Fitzgerald, Deborah A., "Making Every Nanoliter Count," The Scientist, vol. 15, No. 21, 8 pages, Oct. 29, 2001.
Folch, A. et al., "Molding Of Deep Polydimethylsiloxane Microstructures For Microfluidics And Biological Applications," Journal of Biomechanical Engineering, vol. 121, pp. 28-34, Feb. 1999.
Fu, Anne Y. et al., "A Microfabricated Fluorescence-Activated Cell-Sorter," Nature Biotechnology, vol. 17, pp. 1109-1111, Nov. 1999.
Galambos, Paul et al., "Electical And Fluidic Packaging Of Surface Micromachined Electro-Microfluidic Devices," 8 pages, no date.
Gao, Jun et al., "Integrated Microfluidic System Enabling Protein Digestion, Peptide Separation, And Protein Identification," Analytical Chemistry, vol. 73, No. 11, pp. 2648-2655, Jun. 1, 2001.
Garno, Jayne C. et al., "Production Of Periodic Arrays Of Protein Nanostructures Using Particle Lithography," Langmuir, vol. 18, No. 21, pp. 8186-8192, 2002.
Gass, V. et al., "Integrated Flow-Regulated Silicon Micropump," Sensors and Actuators A, vol. 43, pp. 335-338, 1994.
Gerlach, Torsten, "Pumping Gases By A Silicon Micro Pump With Dynamic Passive Valves," Transducers '97, 1997 International Conference on Solid-State Sensors and Actuators, Chicago, Illinois, pp. 357-360, Jun. 16-19, 1997.
Goll, C. et al., "Microvalves With Bistable Buckled Polymer Diaphragms," J. Micromech. Microeng., vol. 6, pp. 77-79, 1996.

Gravesen, Peter et al., "Microfluidics-A Review," J. Micromech. Microeng., vol. 3, pp. 168-192, 1993.

Greene, Chana, "Characterizing The Properties Of PDMS," pp. 1-11, Summer 2000.

Guérin, L. J. et al., "Simple And Low Cost Fabrication Of Embedded Micro-Channels By Using A New Thick-Film Photoplastic," Transducers '97, 1997 International Conference on Solid State Sensors and Actuators, Chicago, Illinois, pp. 1419-1422, Jun. 18-19, 1997.

Harrison, D. Jed et al., "Micromachining A Miniaturized Capillary Eletrophoresis-Based Chemical Analysis System On A Chip," Science, vol. 261, pp. 895-897, Aug. 13, 1993.

Hicks, Jennifer, "Genetics And Drug Discovery Microarray Research," R&D Magazine, pp. 28-33, Feb. 1999.

Hofmann, Oliver et al., "Modular Approach To Fabrication Of Three-Dimensional Microchannel Systems In PDMS—Application To Sheath Flow Microchips," Lab on a Chip, vol. 1, pp. 108-114, 2001.

Horn, Howard, "Lab Chips Sector: Microtechnologies Are Changing Healthcare And More," Life Sciences, pp. 19-21, Mar. 20, 2001.

Hornbeck, Larry J. et al., "Bistable Deformable Mirror Device," Spatial Light Modulators and Applications 1988 Technical Digest Series, Summaries of papers presented at the Spatial Light Modulators and Applications Topical Meeting, Optical Society of America, vol. 8, Postconference Edition, A215, pp. 107-110, Jun. 15-17, 1988.

Hosokawa, Kazuo et al., "Handling Of Picoliter Liquid Samples In A Poly(dimethylsiloxane)-Based Microfluidic Device," Analytical Chemistry, vol. 71, No. 20, pp. 4781-4785, Oct. 15, 1999.

Ikuta, Koji et al., "Three Dimensional Micro Integrated Fluid Systems (MIFS) Fabricated By Stereo Lithography," IEEE, pp. 1-6, 1994.

Jacobson, Stephen C. et al., "High-Speed Separations On A Microchip," Analytical Chemistry, vol. 66, No. 7, pp. 1114-1118, Apr. 1, 1994.

Jacobson, Stephen C. et al., "Microfluidic Devices For Electrokinetically Driven Parallel And Serial Mixing," Analytical Chemistry, vol. 71, No. 20, pp. 4455-4459, Oct. 15, 1999.

Jerman, Hal, "Electrically-Activated, Normally-Closed Diaphragm Valves," Transducers '91, 1991 International Conference on Solid-State Sensors and Actuators, pp. cover, 1045-1048, 1991.

Jo, Byung-Ho et al., "Fabrication Of Three-Dimensional Microfluidic Systems By Stacking Molded Polydimethylsioxane (PDMS) Layers", SPIE, vol. 3877, pp. 222-229, Sep. 1999.

Jo, Byung-Ho et al., "Three-Dimensional Micro-Channel Fabrication In Polydimethylsiloxane (PDMS) Elastomer," Journal of Microelectromechanical Systems, vol. 9, No. 1, pp. 76-81, Mar. 2000.

Jo, Seongbong et al., "Surface Modification Using Silanated Poly-(ethylene glycol)s," Biomaterials, vol. 21, pp. 605-616, 2000.

Jung, D. R. et al.,"Chemistry And Physical Interactions At Metal/ Self-Assembled Organic Monolayer Interfaces," pp. 1-54, 1994.

Kagan, C. R., "Organic-Inorganic Hybrid Materials As Semiconducting Channels In Thin-Film Field-Effect Transistors," Science, vol. 286, pp. 945-947, Oct. 29, 1999.

Kapur, Ravi et al., "Fabrication And Selective Surface Modification Of 3-Dimensionally Textured Biomedical Polymers From Etched Silicon Substrates," Journal of Biomedical Materials Research, vol. 33, pp. 205-216, 1996.

Kenis, Paul J. A. et al., "Microfabrication Inside Capillaries Using Multiphase Laminar Flow Patterning," Science, vol. 285, pp. 83-85, Jul. 2, 1999.

Khoo, Melvin et al., "A Novel Micromachined Magnetic Membrane Microfluid Pump," pp. 1-4, no date.

Kim, Enoch et al., "Micromolding In Capillaries: Applications In Materials Science," J. Am. Chem. Soc., vol. 118, No. 24, pp. 5722-5731, 1996.

Kim, Enoch et al., "Polymer Microstructure Formed By Moulding In Capillaries," Nature, vol. 376, pp. 581-584, Aug. 17, 1995.

Kim, J. H. et al., "The in vitro Blood Compatibility Of Poly(ethylene oxide)-Grafted Polyurethane/Polystyrene Interpenetrating Polymer Networks," J. Biomater. Sci. Polymer Edn, vol. 11, No. 2, pp. 197-216, 2000.

Kirk-Othmer, "Concise Encyclopedia of Chemical Technology," John Wiley & Sons, 5 pages, no date.

Kopp, Matrin U. et al., "Chemical Amplification: Continuous-Flow PCR On A Chip," Science, vol. 280, pp. 1046-1048, May 15, 1998.

Kuhn, Lawrence et al., "Silicon Charge Electrode Array For Ink Jet Printing," IEEE Transactions on Electron Devices, vol. ED-25, No. 10, pp. 1257-1260, Oct. 1978.

Kumar, Amit et al., "Features Of Gold Having Micrometer To Centimeter Dimensions Can Be Formed Through A Combination Of Stamping With An Elastomeric Stamp And An Alkanethiol 'Ink' Followed By Chemical Etching," Appl. Phys. Lett., vol. 63, No. 14, pp. 2002-2004, Oct. 4, 1993.

Kumar, Amit et al., "Patterning Self-Assembled Monolayers: Applications In Materials Science," Langmuir, vol. 10, pp. 1498-1511, 1994.

Lagally, Eric T. et al., "Fully Integrated PCR-Capillary Electrophoresis Microsystem For DNA Analysis," Lab On A Chip, vol. 1, pp. 102-107, 2001.

Lagally, Eric T. et al, "Monolithic Integrated Microfluidic DNA Amplification And Capiallry Electrophoresis Analysis System," Sensors and Actuators B, vol. 63, pp. 138-146, 2000.

Lagally, E. T. et al., "Single-Molecule DNA Amplification And Analysis In An Integrated Microfluidic Device," Analytical Chemistry, vol. 73, No. 3, pp. 565-570, Feb. 1, 2001.

Lammerink, T. S. J. et al., "Modular Concept For Fluid Handling Systems," IEEE, pp. 389-394, 1996.

Li, Paul C. H. et al., "Transport, Manipulation, And Reaction Of Biological Cells On-Chip Using Electrokinetic Effects," Analytical Chemistry, vol. 69, No. 8, pp. 1564-1568, Apr. 15, 1997.

Licklider, Larry et al., "A Micromachined Chip-Based Electrospray Source For Mass Spectrometry," Analytical Chemistry, vol. 72, No. 2, pp. 367-375, Jan. 15, 2000.

Lin, L. Y. et al., "Free-Space Micromachined Optical Switches For Optical Networking," IEEE Journal of Selected Topics in Quantum Electronics, vol. 5, No. 1, pp. 4-9, Jan. 1999.

Liu, Jian et al., "A Nanoliter Rotary Device For Polymerase Chain Reaction," Electrophoresis, vol. 23, pp. 1531-1536, 2002.

Lötters, J C et al., "The Mechanical Properties Of The Rubber Elastic Polymer Polydimethylsiloxane For Sensor Applications," J. Micromech. Microeng., vol. 7, pp. 145-147, 1997.

Lucy, Charles A. et al., "Characteristics Of The Cationic Surfactant Induced Reversal Of Electroosmotic Flow In Capillary Electrophoresis," Anal. Chem., vol. 68, pp. 300-305, 1996.

Malmsten, Martin et al., "Effect Of Chain Density On Inhibition Of Protein Adsorption By Poly(ethylene glycol) Based Coatings," Journal of Colloid and Interface Science, vol. 202, pp. 507-517, 1998.

Maluf, N., "An Introduction To Microelectromechanical Systems Engineering," Artech House Publishers, Boston London, pp. 42-45, Dec. 1999.

Manz, A. et al., "Micromachining Of Monocrystalline Silicon And Glass For Chemical Analysis Sytems," Trends in Analytical Chemistry, vol. 10, No. 5, pp. 144-149, 1991.

Marshall, SID, "Fundamental Changes Ahead For Lab Instrumentation," R&D Magazine, 5 pages, Feb. 1999.

Marsili, Ray, "Lab-On-A-Chip Poised To Revolutionized Sample Prep," R&D Magazine, 5 pages, Feb. 1999.

McDonald, J. Cooper et al., "Fabrication Of Microfluidic Systems In Poly(dimethylsiloxane)," Electrophoresis, vol. 21, pp. 27-40, 2000.

McDonald, J. Cooper et al., "Poly(dimethylsiloxane) As A Material For Fabricating Microfluidic Devices," Accounts of Chemical Research, vol. 35, No. 7, pp. 491-499, 2002.

Muller, Richard S. et al., "Surface-Micromachined Microoptical Elements And Systems," Proceedings of the IEEE, vol. 86, No. 8, pp. 1705-1720, Aug. 1998.

Ng, Jessamine M. K. et al., "Components For Integrated Poly(Dimethylsiloxane) Microfluidic Systems," Electrophoresis, vol. 23, pp. 3461-3473, 2002.

Oleschuk, Richard D. et al., "Analytical Microdevices For Mass Spectrometry," Trends In Analytical Chemistry, vol. 19, No. 6., pp. 379-388, 2000.

Olsson, Anders et al., "Simulation Studies Of Diffuser And Nozzle Elements For Valve-Less Micropumps," Tranducers '97, 1997 International Conference on Solid-State Sensors and Actuators, Chicago, Illinois, pp. 1039-1042, Jun. 16-19, 1997.

Park, Byeong-Deong et al., "The Effect Of PEG Groups On Swelling Properties Of PEG-Grafted-Polystyrene Resins In Various Solvents," Reactive & Functional Polymers, vol. 44, pp. 41-46, 2000.

Pekala, R. W. et al., "Crosslinked Polyether/Polysiloxane Networks For Blood-Interfacing Applications," Biomaterials, vol. 7, pp. 372-378, Sep. 1986.

Pekala, R. W. et al., "Fibrinogen Adsorption And Platelet Adhesion At The Surface Of Modified Polypropylene Glycol/Polysiloxane Networks," Biomaterials, vol. 7, pp. 379-385, Sep. 1986.

Pethig, Ronald et al., "Applications Of Dielectrophoresis In Biotechnology," Tibtech, vol. 15, pp. 426-432, Oct. 1997.

Qin, Dong et al., "Elastomeric Light Valves," Adv. Mater., vol. 9, No. 5, pp. 407-410, 1997.

Qin, Dong et al., "Photolithography With Transparent Reflective Photomasks," J. Vac. Sci. Technol. B vol. 16, No. 1, pp. 98-103, Jan. 1998.

Quake, Stephen R. et al., "From Micro- To Nanofabrication With Soft Materials," Science, vol. 290, pp. 1536-1540, Nov. 24, 2000.

Rapp, R. et al., "LIGA Micropump For Gases And Liquids," Sensors and Actuators A, vol. 40, pp. 57-61, Jan. 1994.

Roylance, Lynn Michelle et al., "A Batch-Fabricated Silicon Accelerometer," IEEE Transactions on Electron Devices, vol. ED-26, No. 12, pp. 1911-1917, Dec. 1979.

Sandia National Laboratories, "Electro Microfluidic Dual In-Line Package (EMDIP)," 2 pages, no date.

Sanjoh, Akira et al., "Spatiotemporal Protein Crystal Growth Studies Using Microfluidic Silicon Devices," Journal of Crystal Growth, vol. 196, pp. 691-702, 1999.

Schasfoort, Richard B. M. et al., "Field-Effect Flow Control For Microfabricated Fluidic Networks," Science, vol. 286, pp. 942-945, Oct. 29, 1999.

Schueller, Olivier J. A. et al., "Fabrication Of Glassy Carbon Microstructures By Soft Lithography," Sensors and Actuators A, vol. 72, pp. 126-139, 1999.

Shoji, Shuichi, "Fluids For Sensor Systems," Topics in Current Chemistry, vol. 194, pp. 163-188, 1998.

Shoji, Shuichi et al., "Smallest Dead Volume Microvalves For Integrated Chemical Analyzing Systems," Transducers '91, 1991 International Conference on Solid-State Sensors and Actuators, San Francisco, California, pp. cover, 1052-1055, 1991.

Smits, J.G., "Piezoelectric Micropump With Three Valves Working Peristaltically," Sensors and Actuators, vol. A21-A23, pp. 203-206, 1990.

Sohn, L. L. et al., "Capacitance Cytometry: Measuring Biological Cells One By One," PNAS, vol. 97, No. 20, pp. 10687-10690, Sep. 26, 2000.

Sung, Cynthia et al., "Synthesis And Characterization Of Polymer Networks Made From Poly(ethylene oxide) And Polysiloxane," Polymer, vol. 31, pp. 556-563, Mar. 1990.

Thompson, L. F. et al., "Introduction To Microlithography," 185th Meeting of the American Chemical Society, Seattle, WA, pp. 2 cover pages, 1-13, Mar. 20-25, 1983.

Thorsen, Todd et al., "Dynamic Pattern Formation In A Vesicle-Generating Microfluidic Device," Physical Review Letters, vol. 86, No. 18, pp. 4163-4166, Apr. 30, 2001.

Tufte, O. N. et al., "Silicon Diffused-Element Piezoresistive Diaphragms," Journal of Applied Physics, vol. 33, No. 11, pp. 3322-3327, Nov. 1962.

Ullmann's Encyclopedia of Industrial Chemistry, Sections 6 to 6.3, Topic: Carbon Black, Sixth Edition, 7 pages, 1999.

Unger, Marc A. et al., "Monolithic Microfabricated Valves And Pumps By Multilayer Soft Lithography," Science, vol. 288, pp. 113-116, Apr. 7, 2000.

Van De Pol, F.C.M. et al., "A Thermo-Pneumatic Actuation Principle For A Microminiature Pump And Other Micromechanical Devices," Sensors and Actuators, vol. 17, Nos. 1-2, pp. 139-143, May 3, 1989.

Van De Pol, F.C.M. et al., "Micro Liquid Handling Devices—A Review," Micro Systems Technologies, vol. 90, pp. 799-805, 1990.

Van Den Berg, A. et al., "Micro Total Analysis Systems," Proceedings of the µTAS '94 Workshop, University of Twente, The Netherlands, 17 pages, Nov. 21-22, 1994.

Van Der Woerd, Mark et al., "Lab-On-A-Chip Based Protein Crystallization," National Aeronautics and Space Adminstration and Caliper, pp. 1-27, Oct. 25, 2001.

Verpoorte, Elisabeth M. J. et al., "Three-Dimensional Micro Flow Manifolds For Miniaturized Chemical Analysis Systems," J. Micromech. Microeng., vol. 7, pp. 246-256, 1994.

Vieider, Christian et al., "A Pneumatically Actuated Micro Valve With A Silicon Rubber Membrane For Integration With Fluid Handling Systems," Transducers '95, 8th International Conference on Solid-State Sensors and Actuators and Eurosensors IX, Stockholm, Sweden, pp. 284-286, Jun. 25-29, 1995.

Washizu, Masao et al., "Molecular Dielectrophoresis Of Biopolymers," IEEE Transactions on Industry Applications, vol. 30, No. 4, pp. 835-843, Jul. 1994.

Whitesides, George M. et al., "Flexible Methods For Microfluidics," Physics Today, pp. 42-48, Jun. 2001.

Whitesides, George M. et al., "Soft Lithography in Biology And Biochemistry," Annu. Rev. Biomed. Eng., vol. 3, pp. 335-373, 2001.

Wibur, James L. et al., "Lithographic Molding: A Convenient Route To Structures With Sub-Micrometer Dimensions," Adv. Mater., vol. 7, No. 7, pp. 649-652, 1995.

Xia, Younan et al., "Complex Optical Surfaces Formed By Replica Molding Against Elastomeric Masters," Science, vol. 273, pp. 347-349, Jul. 19, 1996.

Xia, Younan et al., "Micromolding Of Polymers In Capillaries: Applications In Microfabrication," Chem. Mater., vol. 8, No. 7, pp. 1559-1566, 1996.

Xia, Younan et al., "Reduction In The Size Of Features Of Patterned SAMs Generated By Microcontact Printing With Mechanical Compression Of The Stamp," Adv. Mater., vol. 7, No. 5, pp. 471-473, 1995.

Xia, Younan et al., "Soft Lithography," Angew. Chem. Int. Ed., vol. 37, pp. 551-575, 1998.

Xu, Bing et al., "Making Negative Poisson's Ratio Microstructures By Soft Lithography," Adv. Mater., vol. 11, No. 14, pp. 1186-1189, 1999.

Yang, Xing et al., "A Low Power MEMS Silicone/Parylene Valve," Solid-State Sensor and Actuator Workshop, Hilton Head Island, South Carolina, 4 pages, Jun. 7-11, 1998.

Yang, Xing et al., "A MEMS Thermopneumatic Silicone Membrane Valve," IEEE 10th Annual International Workshop of Micro Electro Mechanical Systems, Nagoya, Japan, pp. cover, 114-118, Jan. 26-30, 1997.

Yang, Zhihao et al., "Protein Interactions With Poly(ethylene glycol) Self-Assembled Monolayers On Glass Substrates: Diffusion And Adsorption," Langmuir, vol. 15, No. 24, pp. 8405-8411, 1999.

Yazdi, Navid et al., "Micromachined Inertial Sensors," Proceedings of IEEE, vol. 86, No. 8, pp. 1640-1659, Aug. 1998.

Young, A. M. et al., "Contoured Elastic-Membrane Microvalves For Microfluidic Network Integration," Journal of Biomechanical Engineering, vol. 121, pp. 2-6, Feb. 1999.

Zengerle, R. et al., "A Micro Membrane Pump With Electrostatic Actuation," Micro Electro Mechanical Systems '92, Travemünde, Germany, pp. 19-24, Feb. 4-7, 1992.

Zengerle, R. et al., "Performance Simulation Of Microminiaturized Membrane Pumps," 7th International Conference on Solid-State Sensors and Actuators, Yokohama, Japan, pp. 2 cover pages, 106-109, Jun. 7-10, 1993.

Zhao, Zhan, et al., "An Integrated Biochip Design And Fabrication," Proceedings of SPIE, vol. 4936, pp. 321-326, 2002.

* cited by examiner

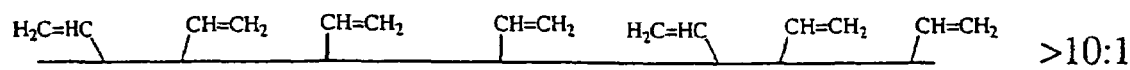
Vinyl excess silicone (only functional groups on the surface are shown)  >10:1
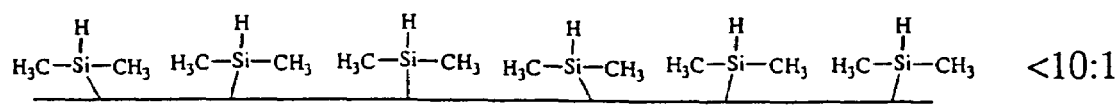
Silane excess silicone (only functional groups on the surface are shown)  <10:1
Figure 1A
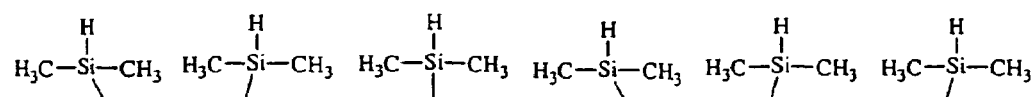
Silane excess silicone (only functional groups on the surface are shown)
| PEG,
| Pt Catalyst
↓
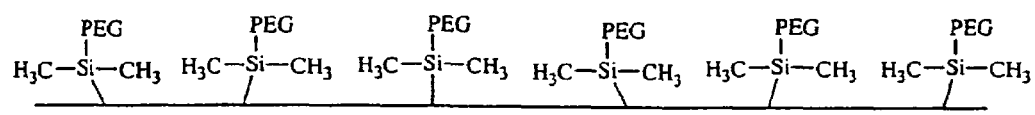
Figure 1B. Surface modification reaction of a silane functional group and PEG.

Silicone surface modification route I:

Where R= -$C_{18}$, -$C_8$, -$C_4$, -phenyl, -PEG, -$(CH_2)_x$-$(CF_2)_y$-$CF_3$, etc.

Silicone surface modification route II:

Where R' = -$C_{18}$, -$C_8$, -$C_4$, -phenyl, -PEG, -$(CH_2)_x$-$(CF_2)_y$-$CF_3$, etc.

Silicone surface modification route III:

Step 1.

Step 2.

Where R' = -$C_{18}$, -$C_8$, -$C_4$, -phenyl, -$CH_2CH_2$-PEG, -$(CH_2)_x$-$(CF_2)_y$-$CF_3$, etc.

(a)

(b)

ATR-FTIR spectra showing surface grafting of AG-160 to GE RTV 615 4:1 PDMS. PDMS (4:1) pieces (1.0×1.5×4.0 cm) were immersed in 5 g pure AG-160 with 10 mg $H_2PtCl_6$ to carry the reaction on at 80 °C for different times shown.

ATR-FTIR spectra of fibrinogen adsorption behavior of the PDMS (4:1) and AG-160-grafted PDMS surfaces.

ATR-FTIR spectra showing surface grafting of AG-160 in water solution to GE 4:1 PDMS. PDMS (4:1) samples (1.0×1.5×4.0 cm) were immersed in 25 ml of AG-160 (10 wt%) aqueous solution with 4 mg $H_2PtCl_6$ catalyst at 80 °C for different times shown.

POLYMER SURFACE MODIFICATION

CROSS-REFERENCES TO RELATED APPLICATIONS

This application claims the benefit of U.S. Provisional Application No. 60/281,929, filed Apr. 6, 2001, which is incorporated herein by reference in its entirety.

FIELD OF THE INVENTION

The present invention relates to a surface modified polymer comprising an exterior surface containing a covalently bonded surface modifying compound and a bulk matrix comprising a reactive polymerizable functional group dispersed therein, and a method for using the same.

BACKGROUND OF THE INVENTION

Polymers are useful in a variety of applications, including fundamental research and biomedical applications such as solid phase diagnostics, drug delivery, biomaterials, and other areas. Unfortunately, many polymer materials are incompatible with a variety of reagents in many applications. For example, proteins and other biomolecules tend to adhere to hydrophobic surfaces, and therefore hydrophobic polymers may not be suitable in some applications where proteins and other biomolecules are involved. Or some type of surface modification/coating will be needed to reduce the non-specific binding (NSB) of these biomolecules to hydrophobic polymer surfaces.

A recent success of fabricating microfluidic devices using an elastic polymer has further increased the utility of polymers in fundamental research and biological applications. Successful fabrication of microfluidic devices from elastic polymers has been particularly useful in small scale sample preparation, chemical synthesis, drug delivery, biomedical devices, and other applications where a micro-scale device is required. Because of a much higher surface area to volume ratio in microfluidic environment, the adsorption of reagents on the surface of the microfluidic devices result in significant changes in reagent concentration and carryover contamination, etc. Therefore, reducing NSB of molecules onto the microfluidic device surface is particularly important.

Recently, surface modification or coating has become a more and more popular way to create "new" materials by selecting core polymer materials for their mechanical properties and then modifying or coating the polymer surface to fit a particular environment. The desired surface properties can be biocompatibility, chemical resistance, wettability, non-stick, etc. Preferably, a surface modification process should be simple, form a covalent bond, and inexpensive. Moreover, it should be mild so as not to degrade the substrate polymer. Commonly used surface modification/coating techniques include plasma deposition, physical vapor deposition, chemical vapor deposition, ion bombardment, ion-beam sputter deposition, ion-beam-assisted deposition, sputtering, thermal spraying, and dipping. Each method has its advantages and disadvantages. For example, if the coating material is not permanently bonded to the polymer, it needs to be reapplied frequently to maintain inertness of the polymer to the reagent.

Inability to produce a permanent coating is particularly true for polymers with low surface energy, such as, polyethylene, poly(dimethylsiloxane) (PDMS or silicone polymer), poly(tetrafluoroethylene) (PTFE, Teflon®). In addition, microfluidic devices have extremely small features, e.g., flow channels having width of as small as 1 μm. Therefore, coating a surface modifying compound may destroy the microfluidic design or render the microfluidic device unusable.

Conventional permanent bonding (grafting) of a surface modifying compound to an organic or inorganic substrate (i.e., glass, silicon, metal, polymer, etc.) requires activation of the substrate surface, i.e., introducing a reactive functional group on the substrate surface. Typically, the substrate surface is activated by ion deposition. Other methods of surface activation include treating with an oxidizing agent, a reducing agent, or a plasma, such as oxygen plasma or water plasma. After a reactive functional group is introduced on the substrate surface, it is reacted with a surface modifying compound to form a covalent bond. Alternatively, the activated surface is reacted with a linker compound which serves as a linker between the substrate surface and the surface modifying compound. Unfortunately, many linkers and solvents used in these processes are not compatible with a large amount of polymeric materials. Also, surface activation processes increase the cost and time for producing such polymeric devices. Moreover, many polymer surface activation processes result in activation of only a small portion of the polymer surface.

Therefore, there is a need for a process of producing a surface modified polymer that does not require a separate polymer surface activation process. There is also a need for microfluidic devices comprising a covalently attached surface modifying compound.

SUMMARY OF THE INVENTION

One aspect of the present invention provides a surface modified polymer comprising:
a bulk polymer matrix comprising an intrinsic functional group dispersed therein; and
a polymeric surface which comprise a surface modifying compound that is covalently bonded to the intrinsic functional group.

Preferably, the bulk matrix comprises at least 1 reactive functional group per 10,000 monomeric units of said polymer.

In one embodiment, the surface modified polymer comprises a channel extending from an exterior surface of the polymer through the bulk polymer matrix, wherein the channel defines an inner surface. Preferably, the inner surface comprises a surface modifying compound that is covalently bonded to the reactive functional group.

In another embodiment, the surface modified polymer comprises a plurality of layers of said bulk polymer matrix, wherein each layer of said bulk polymer matrix comprises a complementary reactive functional group dispersed therein. In this particular embodiment, the interface between two bulk polymer matrix layers is, preferably, covalently bonded through polymerization of the complementary reactive functional groups of said bulk polymer matrix layer.

In one particular embodiment, the surface modified polymer is produced from an off-ratio polymer. Preferably, the surface modified polymer is produced from a silicone off-ratio polymer. More preferably, the silicone off-ratio polymer is room temperature vulcanizing silicone (e.g., RTV).

In another embodiment, the surface modified polymer comprises at least two layers of GE RTV 615 polymers in which the reactive functional groups of two adjoining layers are such that the reactive functional group of one layer is silane and the reactive functional group of the other layer is an olefin.

Still in another embodiment, the intrinsic functional group is selected from the group consisting of silane, olefin, isocyanate, hydroxyl, epoxy, and amine.

Yet in another embodiment, the surface modified polymer is derived from polymerization of at least two different monomeric components. Preferably, the reactive functional groups of a first and second monomeric components are complementary reactive functional groups of each other selected from the group consisting of olefin, silane, hydroxyl, isocyanate, epoxy, amine and a combination thereof.

In one embodiment, the surface modifying compound is a biocompatible compound, thereby rendering the surface modified polymer biocompatible. Preferably, the biocompatible polymer is selected from the group consisting of vinyl terminated small molecules, acrylate terminated small molecules, polyethylene glycol, poly(methyl methacrylate), poly(ethylene vinyl acetate), poly(2-hydroxyethyl methacrylate), polyvinylpyrrolidone, $CH_2$=CH-PEG (i.e., allyl-PEG), and $CH_2$=CH—$(CH_2)_n$-Teflon®.

Another aspect of the present invention provides a polymeric article comprising:
an exterior surface;
a bulk polymer matrix comprising an intrinsic functional group dispersed therein; and
a channel extending from the exterior surface through the bulk polymer matrix, wherein the channel defines an inner surface, wherein the exterior and inner surfaces comprise a surface modifying compound that is covalently bonded to the intrinsic functional group.

In one embodiment, the polymeric article is a microfluidic device. Preferably, the channel defines a fluid flow channel of the microfluidic device.

In one particular embodiment, the surface modifying compound that is covalently attached to the inner surface of flow channel is a stationary phase compound which is capable of separating an analyte in a fluid sample.

In another embodiment, the surface modifying compound that is covalently attached to said exterior surface is a biocompatible compound.

Another aspect of the present invention provides a method for modifying a physical property of a polymer surface comprising:
(a) forming a bulk polymer matrix having an intrinsic functional group dispersed therein; and
(b) producing a surface modified polymer by contacting a surface of the polymer with a surface modifying compound comprising a complementary functional group under conditions sufficient to form a covalent bond between the intrinsic functional group that is present on the polymer surface and the complementary functional group of the surface modifying compound.

In one embodiment, the intrinsic functional group of the bulk polymeric matrix is selected from the group consisting of silane, olefin, isocyanate, hydroxyl, epoxy, and amine.

In one particular embodiment, the surface modifying compound render the polymer resistant to a solvent. Preferably, the surface modifying compound is selected from the group consisting of $CH_2$=CH—$(CH_2)_n$-Teflon®, $CH_2$=CH—$(CH_2)_n$-fluoropolymer, a fluoropolymer containing an acrylate functional group, $CH_2$=CH—$(CH_2)_n$—$CH_3$, where n is an integer from 0 to 30, and preferably from 0 to 20.

In another embodiment, the bulk polymer matrix forming step comprises admixing a first monomeric compound comprising a first reactive functional group with a second monomeric compound comprising a second reactive functional group under conditions sufficient to produce the bulk polymer matrix, wherein the first reactive functional group and the second reactive functional group are complementary functional groups. Preferably, the first reactive functional group and the second reactive functional group are selected from the group consisting of silane, olefin, hydroxyl, isocyanate, epoxy, and amine, such that the first reactive functional group and the second reactive functional group are complementary functional groups.

Still another aspect of the present invention provides a microfluidic device comprising:
(a) a bulk polymer matrix comprising an intrinsic functional group dispersed therein;
(b) a flow channel within said bulk polymer matrix, wherein said flow channel defines an inner surface; and
(c) a surface modifying compound covalently attached to the intrinsic functional group that is present on the inner surface.

Preferably, the bulk polymer matrix comprises at least one reactive functional group per 1000 monomeric unit used to form said bulk polymer matrix.

In one embodiment, the microfluidic device comprises a plurality of layers of said bulk polymer matrix, wherein each layer of said bulk polymer matrix comprises a reactive functional group dispersed therein. Preferably, two adjoining bulk polymer matrix layers are covalently bonded to one another by the reactive functional groups that are complementary to one another.

In one particular embodiment, the intrinsic functional group is selected from the group consisting of silane, olefin, hydroxyl, isocyanate, epoxy, and amine.

Preferably, the bulk polymer matrix is derived from polymerization of at least two different monomeric components. In one particular embodiment, the intrinsic functional group of a first monomeric component and the intrinsic functional group of a second monomeric component are complementary to each other and are selected from the group consisting of olefin, silane, hydroxyl, isocyanate, epoxy, amine, and a combination thereof.

In one embodiment, the surface modifying compound is a biocompatible polymer. In this manner, the microfluidic device can be used in various biophysical applications, including as medical devices, assay devices, sample separation devices, etc. Preferably, the biocompatible polymer is selected from the group consisting of polyethylene glycol, poly(methyl methacrylate), poly(ethylene vinyl acetate), poly(2-hydroxyethyl methacrylate), polyvinylpyrrolidone, $CH_2$=CH-PEG, and $CH_2$=CH—$(CH_2)_n$-Teflon®.

Yet another aspect of the present invention provides a method for producing a microfluidic device comprising a bulk polymer matrix, a flow channel within said bulk polymer matrix, wherein the flow channel defines an inner surface, and a surface modifying compound covalently attached to the inner surface, said method comprising the steps of:
(a) producing the microfluidic device from a polymer precursor under conditions sufficient to produce the bulk polymer matrix comprising an intrinsic functional group dispersed within the inner surface, and
(b) contacting the inner surface with a surface modifying compound under conditions sufficient to covalently attach the surface modifying compound to the inner surface.

Preferably, the bulk polymer matrix comprises at least one reactive functional group per 10,000 monomeric units of said polymer.

In one embodiment, the polymer precursor comprises at least two different monomeric components. Preferably, the reactive functional group of a first monomeric component and the reactive functional group of a second monomeric component are a complementary reactive functional group of each other selected from the group consisting of an olefin, silane, hydroxyl, isocyanate, epoxy, and amine.

BRIEF DESCRIPTION OF THE DRAWINGS

FIG. 1A is a schematic illustration of off-ratio silicone polymers having different intrinsic functional groups on its surface depending on the ratio of each component used.

FIG. 1B illustrates a surface modification reaction between a siliane functional group and polyethylene glycol (i.e., PEG).

DETAILED DESCRIPTION OF THE INVENTION

I. Definitions

Figure 2:
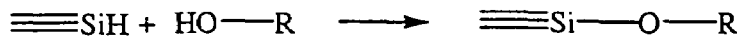
FIG. 2 illustrates a variety of methods for modifying a silicone polymer surface.
Figure 2:
Figure 2:
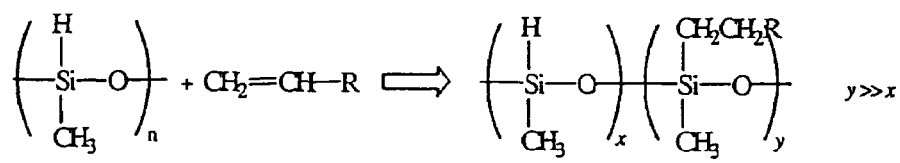
Figure 2:
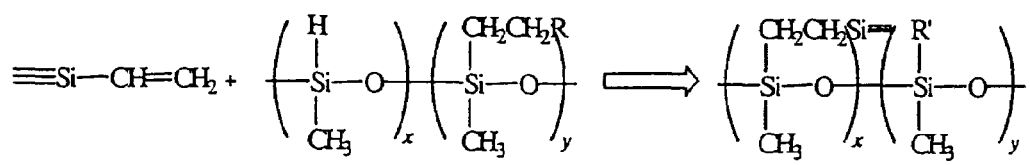

"Polymer" refers to an organic polymer, i.e., a polymer comprising carbon and hydrogen atoms, having a solid bulk polymer matrix. The polymer can also include other atoms such as Si, O, N, P, and S.

The terms "intrinsic functional group", "intrinsic reactive functional group", "reactive polymerizable functional group", "reactive functional group", and "unreacted functional group" are used interchangeably herein and refer to an unreacted functional group present in the polymer. Such functional groups are present in the monomeric or prepolymer or pre-crosslinked polymer unit(s) of the polymer which react to form a polymer. It should be appreciated that the reactive functional group refers to a functional group that is intrinsically present in the polymer without any additional treatment, e.g., activation, of the polymer. Exemplary reactive functional groups include, but are not limited to, silane, alkene, isocyanate, epoxide, hydroxyl, and the like.

"Complementary reactive polymerizable functional group" refers to a functional group present in each polymer component, i.e., monomer or prepolymer or pre-crosslinked polymer, that react with each other to form a polymer.

"Active functional group" of a surface modifying compound refers to a functional group present in the surface modifying compound which reacts with the reactive functional group of the polymer to form a covalent bond. Exemplary active functional groups include, but are not limited to, hydroxy, alkene, silane, epoxide, isocyanate, and the like.

"Off ratio polymer" refers to a polymer which is produced from a combination of two or more monomeric or prepolymer or pre-crosslinked polymer units in which at least one monomeric component is present in excess of the other component(s).

"Property" when referring to the polymer means the polymer's chemical or physical property or both.

"Biocompatible polymer" refers to a polymer which when exposed to a cell does not significantly change the cell morphology, cell and protein activity, and other cellular functions.

"Non-specific Binding" (NSB) refers to the binding of ligand to sites other than the receptor. NSB is typically caused by ionic, hydrogen bonding, or other non-covalent interactions. Physical adsorption of proteins on polymer surface is an example of NSB.

"RTV silicone" refers to room temperature vulcanizing silicone rubber, sometimes referred as poly(dimethylsiloxane), i.e., PDMS.

"Rotary," when referring to a flow channel, refers to a configuration of the flow channel that allows circulation of a fluid within a confined region or section of the fluid flow channel. Such configuration can be a polygon, such as rectangle, hexagon, octagon, and the like; or, preferably, an ellipse or a circle.

The terms "microfabricated flow channel," "flow channel," "fluid channel," and "fluid flow channel" are used interchangeably herein and refer to a channel in a microfluidic device in which a fluid, such as gas or, preferably, liquid, can flow through.

The terms "chromatography column" and "column" are used interchangeably herein and refers to a device or an apparatus which comprises a stationary phase that is capable of separating at least a portion of an analyte in a fluid.

The term "valve" unless otherwise indicted refers to a configuration in which two channels are separated by an elastomeric segment that can be deflected into or retracted from one of the channels in response to an actuation force applied to the other channel.

II. Overview

Conventional methods of covalently attaching a surface modifying compound to an organic or inorganic substrate typically require activation of the substrate surface. In contrast, the present invention provides a polymer comprising an intrinsic reactive functional group on its surface such that a surface modifying compound can be covalently attached to the polymer surface without the need for a surface activation step. Thus, one aspect of the present invention provides a surface modified polymer which comprise a bulk polymer matrix comprising a reactive functional group dispersed therein and a polymeric surface (i.e., polymer surface) which is covalently attached to a surface modifying compound.

The surface modifying compound modifies the physical/chemical characteristics of the polymer surface allowing the surface modified polymer to be used in variety of applications including as chromatography columns, medical devices, chemical assay and/or reaction apparatuses, diagnostic devices, etc. By selecting an appropriate surface modifying compound, the surface modified polymer can be made biocompatible, better solvent resistant, hydrophilic, hydrophobic, wettable, etc. Thus, the surface modified polymers can be used to fabricate a variety of devices, including microfluidic devices such as implantable medical devices, chemical separation devices (e.g., chromatography column), chemical reaction apparatuses and other microfluidic devices.

As stated above, the polymer surface is covalently bonded to the surface modifying compound. This covalent bond is formed by a reaction between a functional group of the surface modifying compound and an intrinsic reactive functional group that is present on the polymer surface. Thus, polymers of the present invention do not require a separate polymer surface activation step, nor the chemical linkers and organic solvents commonly used, thereby significantly reducing the time and cost associated with producing a surface modified polymer. Moreover, since the surface modifying compound is covalently bonded to the polymer surface, problems associated with a non-covalently bound surface modifying compound, such as inability to remain intact and lack of abrasion-resistance during use, are avoided.

The polymer surface comprises a sufficient amount of the reactive functional group to allow a sufficient amount of the surface modifying compound to be covalently bonded to the polymeric surface. In this manner, a reaction between the reactive functional group of the polymeric surface and a surface modifying compound results in a surface modified polymer which has a substantially different surface physical and/or chemical characteristic than a non-surface modified polymer. Preferably, on the average, polymers that are used to produce surface modified polymers of the present invention comprise at least one reactive functional group per 10,000 monomeric units on the polymer surface. More preferably, polymers of the present invention comprise at least one reactive functional group per 1,000 monomeric units on the polymer surface. And most preferably, polymers of the present invention comprise at least one reactive functional group per 100 monomeric units on the polymer surface. In general, to increase the surface area coverage by a surface modifying compound, macromolecules with the desired functional groups are often used. However, small molecules with the appropriate functional groups can also be used to achieve certain properties such as hydrophilicity.

An illustrative example of a polymer which can be produced to contain a reactive functional group on its bulk polymer matrix and the polymer surface is a silicone polymer, e.g., a polymer produced from GE RTV 615. In particular, GE RTV 615 (i.e., RTV) comprises two components: component A which has a vinyl functional group and component B which has a silane functional group. Specifically, components A and B of RTV have the following general structure:

RTV 615A:

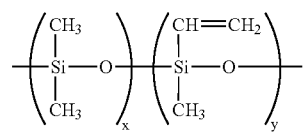

poly(dimethylsiloxane-co-vinylmethylsiloxane)

RTV 615B:

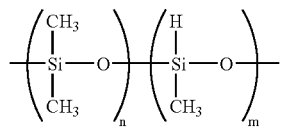

poly(dimethylsiloxane-co-methylhydrosiloxane).

A reaction between the vinyl group of RTV 615A and the silane group of RTV 615B catalyzed by a transition metal, e.g., platinum, results in cross-linking reaction to form a polymer according to the following general reaction scheme:

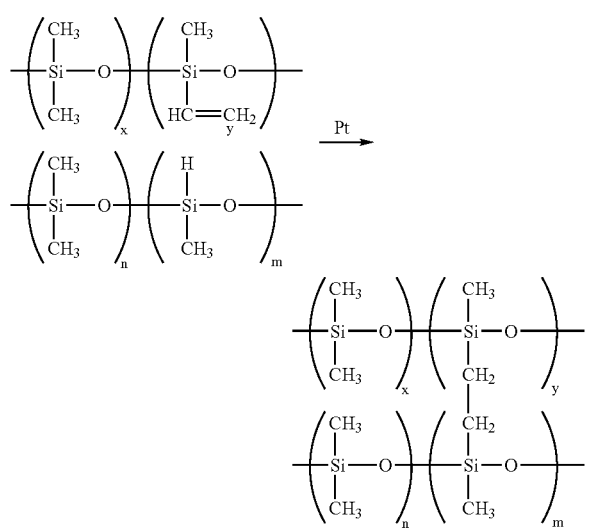

This reaction (i.e., curing process) is typically a platinum catalyzed hydrosilylation crosslinking reaction in which the vinyl group (C=C) is inserted into the silane group (Si—H).

For GE RTV 615, 10:1 ratio of component A to component B is typically used or is recommended in the hydrosilylation cross-linking (i.e., curing) reaction. Thus, the resulting polymer has only a minute amount of unreacted silane or vinyl functional groups. As schematically illustrated in FIG. 1A, for GE RTV 615, when the ratio of A:B is >10:1, the resulting silicone polymer comprises an excess unreacted vinyl group, and when the ratio of A:B is <10:1, the resulting silicone polymer comprises an excess unreacted silane group. These functional groups are dispersed within the bulk polymer matrix and are also present on the polymer surface.

The presence of functional group on the polymer surface allows further reaction with a surface modifying compound directly without the need for a surface activation process. For example, as illustrated in FIG. 1B, reaction between a polymer comprising <10:1 ratio of components A to B with a polyethylene glycol (PEG) results in a covalent bond formation between the silane group and the free hydroxyl group of PEG resulting in a Si—O bond.

There are a number of other surface modification are possible within the scope of the present invention. Depending on the functional group present on the polymer surface, one can select a surface modifying compound with an appropriate functional group to form a covalent bond. For example, FIG. 1C illustrates two surface modification reactions between a silane functional group of the polymer and hydroxyl or vinyl functional group of a surface modifying compound.

In addition, FIG. 1C also provides an example of two step process for modifying the silane functional group. In this embodiment, only a small portion of silane group is reacted with a vinyl compound (when y>x, reaction site amplication is accomplished when the prepolymer is used for grafting). The resulting polymer still comprises unreacted silane group which is reacted with another vinyl group to produce a surface modified polymer comprising two different surface modifying compounds covalently attached to the polymer surface.

Polymers

Any monomer or a combination of monomers which result in a polymer having unreacted functional groups on the polymer surface can be used in the present invention. Generally, however, three types of polymers are useful in producing surface modified polymer of the present invention: an off-ratio polymers, pre-crosslinked polymers and incompletely crosslinked polymers. Exemplary off-ratio polymers include, but are not limited to, silicone RTV, pofyurethane, epoxy, polyurea, unsaturated polyester, etc. Exemplary, pre-crosslinked polymers include, but are not limited to, any vinyl containing elastomer systems, such as, poly(isobutylene isoprene), poly(styrene butadiene), poly(isoprene), poly(butadiene), polychloroprene, vinyl containing rubber gums that can be formulated and milled, etc. The pre-crosslinked rubbers can be surface modified as described herein and vulcanized. Typically, the vulcanization requires a relatively high temperatures; therefore, low temperature reactions, e.g., surface modification, can be carried out prior to the vulcanization reaction. It should be appreciated that the vulcanization reaction reduces or eliminates the reactive functional group within the polymer. Thus, the scope of the present invention includes surface modified polymers in which the reactive functional group within the surface modified polymer is reduced or eliminated by further treating the surface modified polymer, e.g., vulcanizing the surface modified polymer. Exemplary incompletely crosslinked polymers include, but are not limited to, any vinyl containing elastomer systems, such as, poly(isobutylene isoprene), poly(styrene butadiene), poly(isoprene), poly(butadiene), polychloroprene, vinyl containing rubber gums that can be formulated and milled, etc. The crosslinking reaction usually are not complete, therefore, surface modification can be carried utilizing un-reacted functional groups.

In one embodiment, the polymers of the present invention are prepared by combining at least two different components in which each component includes a complementary reactive functional group. The ratio of each component is selected such that there is an excess of at least one component to provide unreacted function group within the bulk polymer matrix and the polymer surface. Preferably, polymers of the present invention comprise at least one reactive functional group per 10,000 monomeric units within the bulk polymer matrix. More preferably, polymers of the present invention comprise one reactive functional group per 1,000 monomeric units within the bulk polymer matrix. And most preferably, polymers of the present invention comprise one reactive functional group per 100 monomeric units within the bulk polymer matrix. Preferably, these polymers are produced using an off ratio of each component. Particularly useful off ratio polymers include, but are not limited to:

silicone polymers which can be produced from monomers comprising a silane and an olefin reactive polymerizable functional groups, e.g., GE's RTV 615, and Dow Coming's Sylgard 184, 182 186;

polyurethane/polyurea polymers which can be produced from monomers comprising a diisocyanate and an di-alcohol or di-amine reactive polymerizable functional groups, e.g., Synair's 2612020, 261S111 and 261S333 or Uniroyal's Vibrathane 504;

polyisoprene, polybutadiene, polychloroprene which are polymerized from diene monomers, and therefore have one double bond per monomer when polymerized. This double bond on the surface allows the covalent bonding of a surface modifying compound to the polymer. The polymer rubber can then be vulcanized to form a soft elastomer product; and styrene butadiene rubber which is produced from an olefin and a diene reactive functional groups of styrene and butadiene, respectively; The double bond presented in the pre-crosslinked and incompletely crosslinked polymer allows the surface of the polymer to be modified.

Preferable, polymers of the present invention comprise off ratio polymer which comprises complementary reactive groups selected from the group consisting of silane, olefin, hydroxyl, isocyanate, epoxy, and amine. It should be appreciated that the complementary reactive groups are selected such that they are reactive toward each other. For example, if the first monomer component comprises a silane functional group, the second monomer component is selected such that it comprises an olefin, hydroxyl or amine functional group. And if the first monomer component comprises an isocyanante functional group, the second monomer component is selected such that it comprises a hydroxyl or amine functional group, and so forth. In one particular embodiment of the present invention, the polymer is derived from at least two PDMS resins containing silane and olefin functional groups, respectively.

The amount of each component is selected such that the relative molar ratio of the reactive functional group of one monomeric unit is present in excess of the other(s). In this manner, a significant amount of the reactive functional group of the excess monomer remains unreacted within the bulk polymer matrix and on the polymer surface. Preferably, at least about 1% of the reactive functional group of the excess monomer remains unreacted, more preferably at least about 6%, and most preferably at least about 30%. Alternatively, polymers of the present invention comprise one unreacted reactive functional group per about 10,000 monomeric units, preferably per about 1,000 monomeric units, and more preferably per about 100 monomeric units.

In one particular embodiment, the polymer is derived from two monomer/prepolymer components. Preferably, the polymer is produced by combining the respective monomer/prepolymer at a relative molar stoichiometric equivalent ratio of from 1:10 to about 1:3, more preferably at a relative molar ratio of from 1:5 to about 1:2, and most preferably at a relative molar ratio of from 1:2 to about 1:1.1.

Other Suitable Polymer Materials

Allcock et al., *Contemporary Polymer Chemistry*, $2^{nd}$ Ed. describes elastomers in general as polymers existing at a temperature between their glass transition temperature and liquefaction temperature. Elastomeric materials exhibit elastic properties because the polymer chains readily undergo torsional motion to permit uncoiling of the backbone chains in response to a force, with the backbone chains recoiling to assume the prior shape in the absence of the force. In general, elastomers deform when force is applied, but then return to their original shape when the force is removed. The elasticity exhibited by elastomeric materials can be characterized by a Young's modulus. Elastomeric materials having a Young's modulus of between about 1 Pa to about 1 TPa, more preferably between about 10 Pa to about 100 GPa, more preferably between about 20 Pa to about 1 GPa, more preferably between about 50 Pa to about 10 MPa, and more preferably between about 100 Pa to about 1 MPa are particularly useful in accordance with the present invention. However, elastomeric materials having a Young's modulus outside of these ranges, as well as non-elastomeric materials could also be utilized depending upon the needs of a particular application.

Surface modified polymers of the present invention can be produced from a wide variety of elastomers, preferably off ratio polymers. In some applications, surface modified polymers of the present invention are produced from an elastomeric polymer such as GE RTV 615, a vinyl-silane crosslinked silicone elastomer. An important requirement for materials which are useful in producing surface modified polymers is the ability to form a polymer with unreacted functional group.

In one particular embodiment of the present invention, a monolithic polymer is produced from a plurality of layers of elastomers which can be bonded together. In the case of multilayer soft lithography, which is discussed in detail below, layers of elastomer are cured separately and then bonded together. This scheme requires that cured layers possess sufficient reactivity to bond together. The two bonding layers can be of the same type, which are capable of bonding to themselves, or they can be of two different types, which are capable of bonding to each other. Other possibilities include the use an adhesive between layers and the use of thermoset elastomers.

Given the tremendous diversity of polymer chemistries, precursors, synthetic methods, reaction conditions, and potential additives, there are a huge number of possible polymer, preferably elastomer, systems that could be used to make monolithic elastomeric structures, such as microfluidic devices, discussed below. Variations in the materials used most likely are driven by the need for particular material properties, e.g., stiffness, gas permeability, or temperature stability.

Common elastomeric polymers include, but are not limited to, polyisoprene, polybutadiene, polychloroprene, polyisobutylene, poly(styrene-butadiene-styrene), the polyurethanes, and silicones. The following is a non-exclusive list of elastomeric materials which can be utilized in connection with the present invention: polyisoprene, polybutadiene, polychloroprene, polyisobutylene, poly(styrene-butadiene-styrene), the polyurethanes, and silicone polymers; or poly (bis(fluoroalkoky)phosphazene) (PNF, Eypel-F), poly(carborane-siloxanes) (Dexsil), poly(acrylonitrile-butadiene) (nitrile rubber), poly(1-butene), poly(chlorotrifluoroethylene-vinylidene fluoride) copolymers (Kel-F), poly(ethyl vinyl ether), poly(vinylidene fluoride), poly(vinylidene fluoride-hexafluoropropylene) copolymer (Viton), elastomeric compositions of polyvinylchloride (PVC), polysulfone, polycarbonate, polymethylmethacrylate (PMMA), and poly-tertrafluoroethylene (Teflon).

In addition, polymers incorporating materials such as chlorosilanes or methyl-, ethyl-, and phenylsilanes, and polydimethylsiloxane (PDMS) such as Dow Chemical Corp. Sylgard 182, 184 or 186, or aliphatic urethane diacrylates such as, but not limited to, Ebecryl 270 or Irr 245 from UCB Chemical can also be used.

In some methods, elastomers can also be "doped" with uncrosslinkable polymer chains of the same class. For instance RTV 615 can be diluted with GE SF96-50 Silicone Fluid. This serves to reduce the viscosity of the uncured elastomer and reduces the Young's modulus of the cured elastomer. Essentially, the crosslink-capable polymer chains are spread further apart by the addition of "inert" polymer chains, so this is called "dilution". RTV 615 cures at up to 90% dilution, with a dramatic reduction in Young's modulus.

Other examples of doping of elastomer material can include the introduction of electrically conducting or magnetic species. Should it be desired, doping with fine particles of material having an index of refraction different than the elastomeric material (i.e. silica, diamond, sapphire) is also contemplated as a system for altering the refractive index of the material. Strongly absorbing or opaque particles can be added to render the elastomer colored or opaque to incident radiation. This can conceivably be beneficial in an optically addressable system.

While elastomers are preferred materials for fabricating certain surface modified polymer articles of the present invention, e.g., microfluidic devices, non-elastomer based polymer articles are also within the scope of the present invention.

Surface Modification Compounds

A wide variety of surface modification compounds can be used to modify the polymer surface depending on a particular characteristic(s) desired. By selecting an appropriate surface modifying compound, the resulting surface modified polymer can be made to be biocompatible, chemically resistance, hydrophilic, hydrophobic, non-sticky, wettable, or combinations thereof. For example, polyethylene glycol (PEG), mPEG, polyvinyl acetate (PVA), poly(methyl methacrylate) (PMMA), poly(ethylene vinyl acetate), poly(2-hydroxyethyl methacrylate), polyvinylpyrrolidone, $CH_2=CH$-PEG (i.e., single vinyl terminated PEG), Teflon®, polycarbonate, $CH_2=CH-(CH_2)_n$-Teflon® (where n=1 to 20, i.e., single or double vinyl terminated Teflon®), $CH_2=CH-CH_2)_n$-fluoropolymer, and the like can be used to render the polymer biocompatible or solvent resistant. And polymers having non-sticky surfaces can be produced by using a surface modifying compound such as Teflon®, fluoro-containing polymers and copolymers, and the like with vinyl terminal or side groups for chemical solvent resistance and non-sticky surfaces. Moreover, polymers having hydrophilic surfaces can be produced by using a surface modifying compound such as polyvinylpyrrolidone, PVA, PEG, and the like. In addition, polymers having a low surface friction can be produced by using a surface modifying compound such as polyvinylpyrrolidone, PVA, PEG, Teflon®, and the like. Furthermore, polymers useful in chromatography can be produced by using a surface modifying compound which form a stationary phase of a chromatography column. Exemplary surface modifying compounds which can form a stationary phase include, but are not limited to, 1-octadecanol, 1-octadecene, octadecylsilane, octadecyltrichlorosilane, octadecyl isocyanate, trioctedecylsilane, etc. for $C_{18}$ grafting (e.g., for stationary phase for $C_{18}$ reverse phase chromatography), and corresponding chemicals for $C_8$, $C_4$ or $C_2$ grafting.

As stated above, it has been found by the present inventors that the surface of polymers having an intrinsic functional group can be readily modified by covalently attaching a surface modifying compound. Such polymers do not require a separate polymer surface activation step.

In one particular embodiment of the present invention, the surface modifying compound renders the resulting surface modified polymer biocompatible. Preferably, the biocompatible polymer is derived from covalently attaching a surface modifying compound that is selected from the group consisting of polyethylene glycol, methyl polyethylene glycol, $CH_2=CH$-PEG (single vinyl terminated PEG), and $CH_2=CH-(CH_2)_n$-Teflon (single or double vinyl terminated Teflon).

In another embodiment, the surface modified polymer is used as a chromatography column by covalent attaching a suitable stationary phase compound to an inner surface of a flow channel, which acts as a chromatography column, that is present in the surface modified polymer. Surface modified polymers comprising a flow channel is discussed in detail below.

Suitable stationary phase compounds for a particular application are well known to one skilled in the art. For example, useful stationary phase compounds include, but are not limited to, 1-octadecanol, 1-octadecene, octadecylsilane, octadecyltrichlorosilane, octadecyl isocyanate, trioctedecylsilane, etc. for $C_{18}$ grafting (e.g., stationary phase for $C_{18}$ reverse phase LC), and corresponding compounds for $C_8$, $C_4$ or $C_2$ stationary phase.

The stationary phase compounds can be attached to the inner surface of the chromatography column by contacting the stationary phase compound to the inner surface under conditions sufficient to produce a covalent bond. For example, attachment of 1-octadecene to a polymer comprising an intrinsic silane functional group (e.g., Si—H) can be achieved by contacting, e.g. immersing, spraying, or coating, the polymer with 1-octadecene which have a terminal olefin group. The silane group reacts with the olefin group to form an alkyl-silane bond to produce a C-18 stationary phase column. In one particular embodiment of the present invention, the stationary phase compound is useful in forming an open tubular liquid chromatography (i.e., OTLC) column, packed capillary liquid chromatography (i.e., PCLC) column, or mixtures thereof.

In general, the surface modifying compound can be covalently attached the polymer surface by contacting the surface modifying compound to the polymer surface under conditions sufficient to produce a covalent bond. For example, covalent bond formation between polyethylene glycol and a polymer comprising an intrinsic silane functional group (e.g., Si—H) can be achieved by contacting, e.g., immersing, spraying, or coating, the polymer surface with polyethylene glycol having a terminal hydroxy group. FIG. 2 schematically illustrates three methods for modifying a polymer surface comprising silane functional group. In the first method, silane is reacted with a hydroxyl group to form a silicon-oxygen bond. And the second and third methods of FIG. 2 illustrate formation of a silicon-alkyl bond by reacting silane with an olefin.

When forming a covalent bond with the intrinsic functional group of the polymer, the surface modifying compound can be in the form of a solution in an inert solvent. Or if the surface modifying compound is a gas, a liquid, or a solid with a melting temperature lower than the reaction temperature (e.g., 200° C. or less), it can be used directed without any solvent. When the surface modifying compound is in a solution, the solvent used is relatively inert to the reactive functional group under the reaction conditions. Suitable inert solvents for a particular reactive functional group are well known to one of ordinary skill in the art. For example, suitable inert solvents for a silane reactive functional group include water, methanol, ethanol, isopropanol (IPA), hydrocarbons, ethyl ether, tetrahydrofuran, dimethoxyethane (DME), dimethyl formaldehyde, chloroform, dichloromethane, toluene, xylene, and the like.

Typically, at least about 1 equiv. of the surface modifying compound is used, preferably at least about 10 equiv., and more preferably at least about 100 equiv. As used herein, the equiv. of the surface modifying compound refers to the equiv. amount of the active functional group of the surface modifying compound relative to the theoretical amount of the intrinsic functional group present on the polymer surface.

The reaction temperature between the polymer and the surface modifying compound depends on a variety of factors including, the stability of the polymer at an elevated temperature, the concentration and reactivity of the function groups, the concentration of the catalyst, the stability of the covalent bond that is formed, etc. For example, in reacting PEG to a polymer comprising a silane reactive functional group, the reaction temperature is typically from 20° C. to about 200° C., preferably from about 50° C. to about 120° C., and more preferably from 70° C. to about 90° C.

The reaction time also depends on a variety of factors such as concentration of the surface modifying compound, the concentration of the catalyst, the reaction temperature, reactivity of the functional groups, and the like. For reacting an allyl-PEG or an olefin, such as 1-octadecene, to a polymer comprising a silane group, the reaction time is typically from about 10 min to about 24 h, preferably from about 20 min to about 4 h, and more preferably from about 30 min to about 2 h.

Applications

Surface modified polymers of the present invention are useful in a variety of applications, including all conventionally known applications for polymers in general and in particular, in applications where a surface modified polymer is currently used. For example, surface modified polymers of the present invention comprising covalently attached PEG are biocompatible and reduce or prevent protein adsorption and cell attachment. These types of surface modified polymers are particularly useful as biosensors, contact lenses, intraocular lenses, non-fouling food container, heart valves, blood storage containers, blood contacting tubings, cell and protein separation systems, catheters, immuoassays, dialysis membranes, enzyme reactors, solid phase nucleic acid or peptide synthesis, pace maker leads, etc. And chemical resistant surface modified polymers, such as those derived from covalently bonding poly(tetrafluoroethylene) (PTFE or Teflon®), can be used in applications where chemical solvent resistance is desired, such as seals, gaskets, solvent containers, machine parts, tubing, non-sticky surfaces, etc. In addition, surface modified polymers having a low surface friction can be used in a variety of applications where such polymers are desirable, such as in catheter, etc. Moreover, surface modified polymers of the present invention comprising a covalently bound stationary phase compound within the inner surface of the flow channel are useful in chromatography processes and can be used to separate proteins, peptides, and other organic molecules. For example, stationary phase compound bonded surface modified polymers can be used in reverse phase LC, normal phase LC, affinity LC, hydrophobic interaction LC, cation/anion interaction LC, etc. Furthermore, surface modified polymers that are hydrophilic can be used in any application that require a hydrophilic polymer surface. Such hydrophilic surface modified polymers can be produced by covalently bonding polymers comprising an intrinsic functional group with a hydrophilic surface modification compound, such as, poly(2-hydroxyethyl methacrylate), polyvinylpyrrolidone), etc.

Microfluidic Devices

In one particular aspect of the present invention, the surface modified polymers are used in producing microfluidic devices. Use of microfluidic devices has become increasing common recently in fundamental research and biological applications, including, but not limited to, small scale sample preparation, chemical synthesis, drug delivery, biomedical devices, and other applications where a microscale device is desired. While these microfluidic devices have become increasingly popular, one of the limitations for using the microfluididic devices have been the NSB of biomolecules to the polymer surface. Because of the higher surface area to volume ratio in microfluidic environment, the adsorption of reagents in the microfluidic devices onto the surface of the devices result in significant changes in reagent concentration and carryover contamination, etc. Therefore, reducing NSB of the biomolecules onto the microfluidic device surface is of particular importance. Also, many polymers are incompatible in biological systems and many conventional polymers are not chemically resistant to organic solvents, thereby rendering these micruofluidic devices unusable in applications involving biological systems and applications involving organic solvents.

While the surface of conventional polymers can modified by activating the polymer surface and covalently attaching a surface modifying compound, these processes require a separate surface activation process, which increases the cost and time to fabricate microfluidic devices. In addition, many surface activation processes results in inadequate amount of surface activation, thereby rendering the resulting polymers still incompatible with the environment for which they are intended to be used in.

Microfluidic devices fabricated from polymers comprising intrinsic functional groups can avoid these shortcomings by producing the polymers such that there is a sufficient amount of intrinsic functional groups for covalently attaching a surface modifying compound. Furthermore, polymers comprising intrinsic functional groups do not require a separate surface activation process, thereby significantly reducing the cost and time for fabrication microfluidic devices.

Microfluidic devices are can be constructed by any conventional methods known to one skilled in the art, including single and multilayer soft lithography (MLSL) techniques and/or sacrificial-layer encapsulation methods which are disclosed in U.S. patent application Ser. No. 09/605,520, filed Jun. 27, 2000, PCT Publication No. WO 01/01025, and Unger et al. (2000) Science 288:113-116, which are incorporated herein by reference in their entirety.

Microfluidic devices of the present invention comprise a microfabricated flow channel. In addition, microfluidic devices of the present invention can optionally further comprise a variety of plumbing components (e.g., pumps, valves, and connecting channels) for flowing fluids (i.e., gas or, preferably, liquid) such as reagents, solvents, and samples. The microfluidic devices can also comprise an array of reservoirs for storing reaction reagents (e.g., solvents, samples, eluents, and other reagents can each be stored in a different reservoir). The flow channel can be located within the bulk polymer matrix or it can be at enclosed by a combination of a solid support and the bulk polymer matrix. Thus, the flow channel comprises an inner surface, at least a portion of which defined by the bulk polymer matrix.

Preferably, the surface modifying compound is covalently bonded to any surface in which a surface modification is desired, including the exterior surface of the bulk polymer matrix and/or the inner surface the flow channel. The microfluidic devices can comprise a plurality of microfabricated flow channels that are interconnected to suit a variety of applications. The flow channel can also comprise a window to allow optical interrogation.

Microfluidic devices require a smaller sample size and the amount of reagent(s). It also increases reagent exchange rate and the speed of sample analysis or preparation. In addition, the microfluidic devices provide parallelization: many flow channels can be built on the same substrate, e.g., polymer. This allows analysis, preparation, and/or synthesis of a plurality of diverse samples simultaneously. All these advantages result in high speed and high throughput sample preparation, analysis, and/or synthesis regimes.

Basic Features of the Microfluidic Devices

The microfluidic devices of the present invention comprise a basic "flow channel" structure. The term "flow channel", "fluid channel", or "microfabricated flow channel" refers to recess in a structure which can contain a flow of fluid such as gas or, preferably, liquid. Preferably, the surface modifying compound is covalently attached to the inner surface of the flow channel(s).

The microfluidic devices can also comprise a control channel. The control channel functions as the plumbing components of the microfluidic devices, e.g., valves and pumps, which is comprised of one or more valves. A "valve" refers to a segment of bulk polymer matrix, preferably an elastomeric segment, that separates the flow channel and the control channel. The valve can be deflected into or retracted from the flow channel in response to an actuation force applied to the control channel.

The inner surface of control channels can also be covalently bonded to the surface modifying compound. However, because the control channels typically do not come in contact with incompatible environmental conditions, it is not necessary to attach a surface modifying compound to inner surfaces of the control channels.

In some applications, microfabricated flow channels are cast on a chip (e.g., a elastomeric chip). Fluid channels are formed by bonding the chip to a flat substrate (e.g., a glass cover slip or another polymer) which seals the channel. Thus, one side of the fluid channel is provided by the flat substrate. Typically, the surface modifying compound is attached to the inner surface of the fluid channel. However, it should be appreciated that any microfluidic device surface which may come in contact with a reagent or a sample fluid is covalently bonded to a surface modifying compound. For example, for an implantable microfluidic device, preferably the entire polymer surface, including the inner fluid flow surface and exterior surface of the bulk polymer matrix, is covalently attached to a biocompatible surface modifying compound, thereby reducing or eliminating any potential interaction between the host (e.g., patient) and the device.

As stated above, the plumbing components can also be microfabricated within the microfluidic device. Thus, microfluidic devices can include an integrated flow cell in which a plurality of fluid channels are present. In addition, microfluidic devices can also include fluidic components, such as micro-pumps, micro-valves, and connecting channels, for controlling the flow of fluids into and out of the flow cell. Alternatively, microfluidic devices of the present invention can utilize other plumbing devices. See, for example, Zdeblick et al., *A Microminiature Electric-to-Fluidic Valve*, Proceedings of the 4th International Conference on Solid State Transducers and Actuators, 1987; Shoji et al., *Smallest Dead Volume Microvalves for Integrated Chemical Analyzing Systems*, Proceedings of Transducers '91, San Francisco, 1991; and Vieider et al., *A Pneumatically Actuated Micro Valve with a Silicon Rubber Membrane for Integration with Fluid Handling Systems*, Proceedings of Transducers '95, Stockholm, 1995, all of which are incorporated herein by reference in their entirety.

At least some of the components of the microfluidic devices of the present invention are microfabricated. Employment of microfabricated fluid channels and/or microfabricated plumbing components significantly reduce the dead volume and decrease the amount of time needed to exchange reagents, which in turn increase the throughput. Microfabrication refers to feature dimensions on the micron level, with at least one dimension of the microfabricated structure being less than 1000 µm. In some microfluidic devices, only the fluid channels are microfabricated. In some microfluidic devices, in addition to the fluid channels, the valves, pumps, and connecting channels are also microfabricated. Unless otherwise specified, the discussion below of microfabrication is applicable to production of all microfabricated components of the microfluidic devices (e.g., the fluid channels, valves, pumps, and connecting channels).

As stated above, various materials can be used to produce the microfluidic devices. Preferably, microfluidic devices of the present invention comprise an elastomeric polymer. In some embodiments, microfluidic devices are integrated (i.e., monolithic) microstructures that are made out of various layers of elastomer bonded together. By bonding these various elastomeric layers together, the recesses extending along the various elastomeric layers form fluid channels and/or control channels through the resulting monolithic, integral elastomeric structure.

In general, the microfabricated structures (e.g., fluid channels, pumps, valves, and connecting channels) have widths of about 0.01 to 1000 microns, and a width-to-depth ratios of between 0.1:1 to 100:1. Preferably, the width is in the range of 10 to 200 microns, a width-to-depth ratio of 3:1 to 15:1.

Basic Methods of Microfabrication

Various methods can be used to produce the microfabricated components of the microfluidic devices of the present invention. Fabrication of the microchannels, such as fluid flow channels, valves, and pumps, can be performed as described in the above incorporated U.S. patent application Ser. No. 09/605,520, filed Jun. 27, 2000, PCT Publication No. WO 01/01025, and Unger et al. (2000) Science 288: 113-116.

Figure 3:
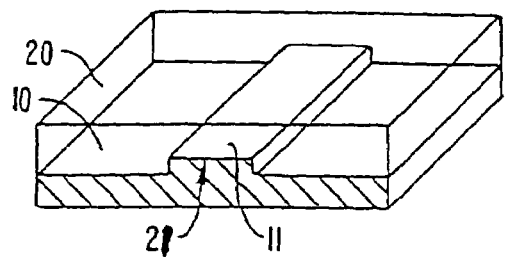
FIG. 3 is an illustration of a first elastomeric layer formed on top of a micromachined mold.

In some methods, as illustrated in FIGS. 3-9B, pre-cured elastomer layers are assembled and bonded to produce a flow channel. As illustrated in FIG. 3, a first micro-machined mold 10 is provided. Micro-machined mold 10 can be fabricated by a number of conventional silicon processing methods including, but not limited to, photolithography, ion-milling, and electron beam lithography. The micro-machined mold 10 has a raised line or protrusion 11 extending therealong. A first elastomeric layer 20 is cast on top of mold 10 such that a first recess 21 can be formed in the bottom surface of elastomeric layer 20, (recess 21 corresponding in dimension to protrusion 11), as shown.

Figure 4:
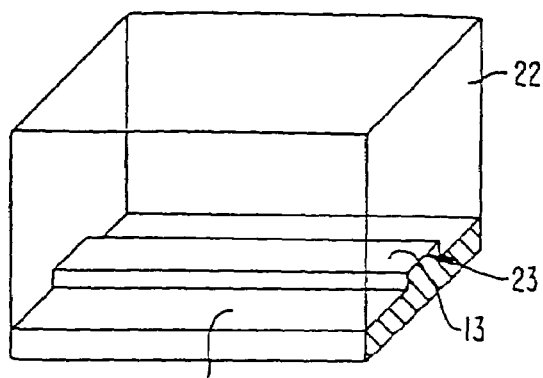
FIG. 4 is an illustration of a second elastomeric layer formed on top of a micromachined mold.

As can be seen in FIG. 4, a second micro-machined mold 12 having a raised protrusion 13 extending therealong is also provided. A second elastomeric layer 22 is cast on top of mold 12, as shown, such that a recess 23 can be formed in its bottom surface corresponding to the dimensions of protrusion 13.

Figure 5:
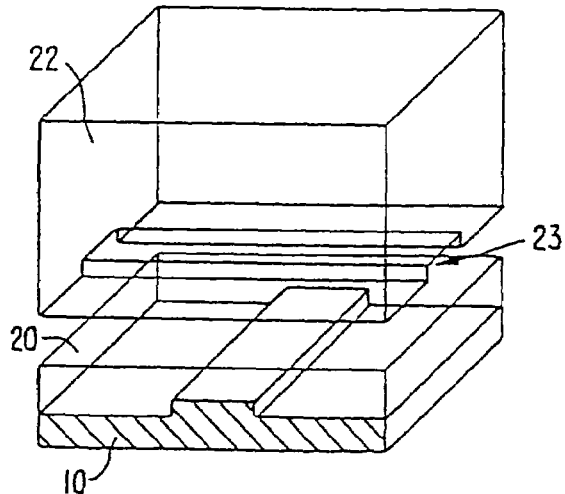
FIG. 5 is an illustration of the elastomeric layer of FIG. 4 removed from the micromachined mold and positioned over the top of the elastomeric layer of FIG. 3
Figure 6:
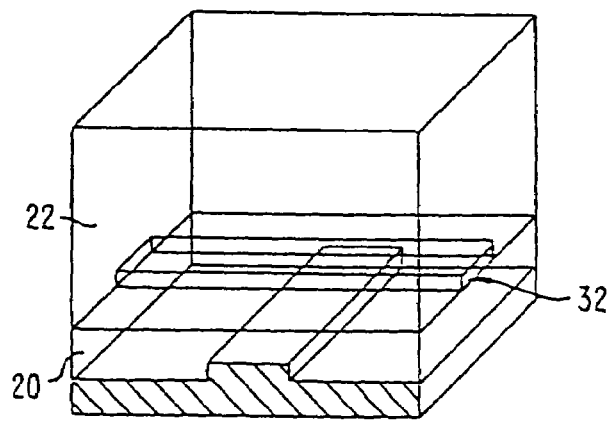
FIG. 6 is an illustration corresponding to FIG. 5, but showing the second elastomeric layer positioned on top of the first elastomeric layer.

As can be seen in the sequential steps illustrated in FIGS. 5 and 6, second elastomeric layer 22 is then removed from mold 12 and placed on top of first elastomeric layer 20. As can be seen, recess 23 extending along the bottom surface of second elastomeric layer 22 forms a flow channel 32.

Figure 7:
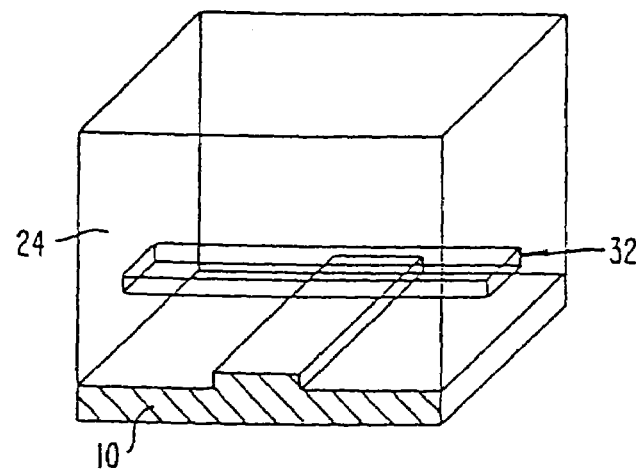
FIG. 7 is an illustration corresponding to FIG. 6, but showing the first and second elastomeric layers bonded together.

Referring to FIG. 7, the separate first and second elastomeric layers 20 and 22 (FIG. 6) are then bonded together to form an integrated (i.e., monolithic) elastomeric structure 24.

Figure 8:
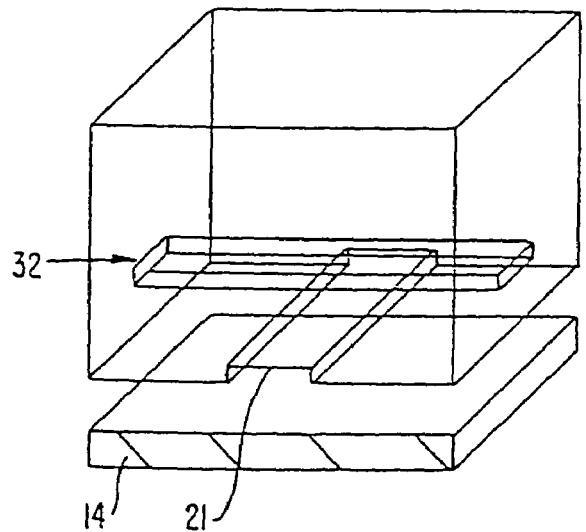
FIG. 8 is an illustration corresponding to FIG. 7, but showing the first micromachine mold removed and a planar substrate positioned in its place.
Figure 9A:
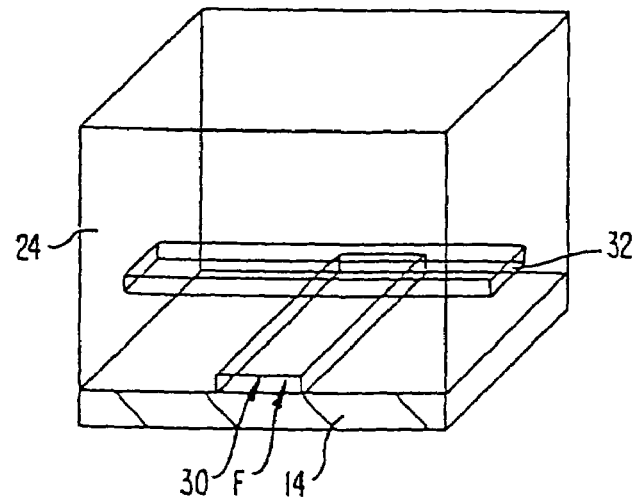
FIG. 9A is an illustration corresponding to FIG. 8, but showing the elastomeric structure sealed onto the planar substrate.
Figure 9B:
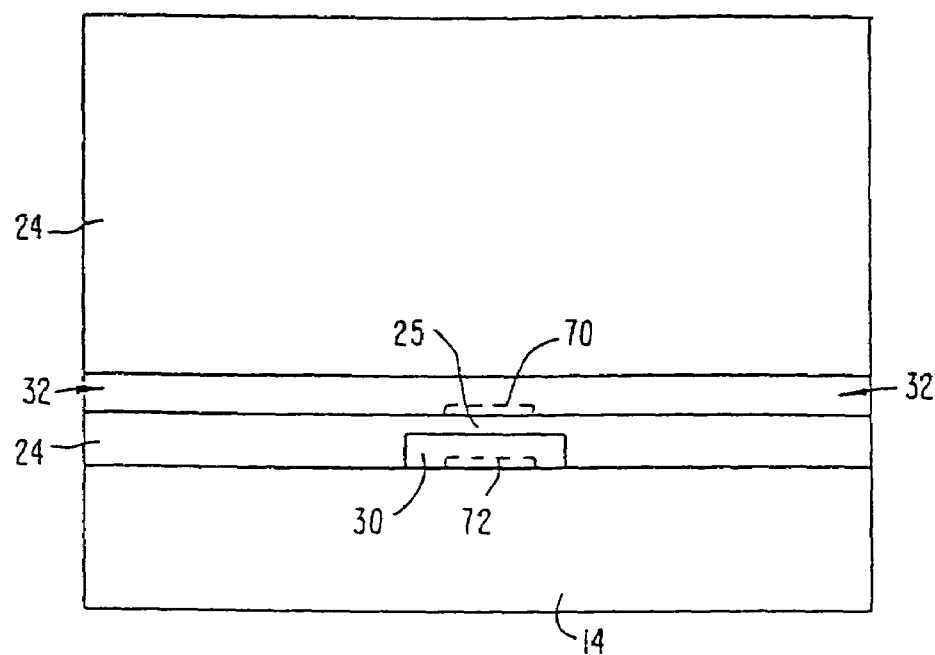
FIG. 9B is a front sectional view corresponding to FIG. 9A, showing an open flow channel.

As can been seen in the sequential step of FIGS. 8 and 9A, elastomeric structure 24 is then removed from mold 10 and positioned on top of a planar substrate 14. As can be seen in FIGS. 9A and 9B, when elastomeric structure 24 has been sealed at its bottom surface to planar substrate 14, recess 21 forms a flow channel 30.

The present elastomeric structures can form a reversible hermetic seal with nearly any smooth planar substrate. An advantage to forming a seal this way is that the elastomeric structures can be peeled up, washed, and re-used. In some microfluidic devices, planar substrate 14 is glass. A further advantage of using glass is that glass is transparent, allowing optical interrogation of elastomer channels and reservoirs. Alternatively, the elastomeric structure can be bonded onto a flat elastomer layer by the same method as described above, forming a permanent and high-strength bond. This can prove advantageous when higher back pressure is used.

In some methods, microfabrication involves curing each layer of elastomer "in place" (FIGS. 10 to 20). In these methods, fluid flow and control channels are defined by first patterning sacrificial layer on the surface of an elastomeric layer (or other substrate, which can include glass) leaving a raised line of sacrificial layer where a channel is desired. Next, a second layer of elastomer is added thereover and a second sacrificial layer is patterned on the second layer of elastomer leaving a raised line of sacrificial layer where a channel is desired. A third layer of elastomer is deposited thereover. Finally, the sacrificial layer is removed by dissolving it out of the elastomer with an appropriate solvent, with the voids formed by removal of the sacrificial layer becoming the flow channels passing through the microfluidic device.

Figure 10:
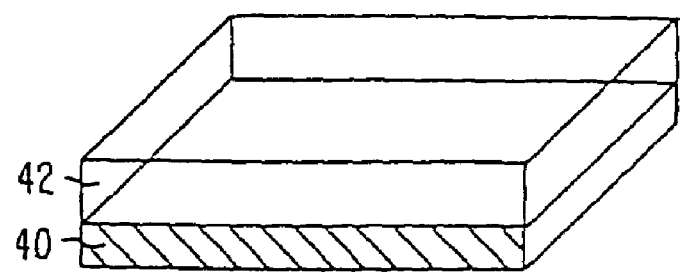
FIG. 10 is an illustration of a first elastomeric layer deposited on a planar substrate.
Figure 11:
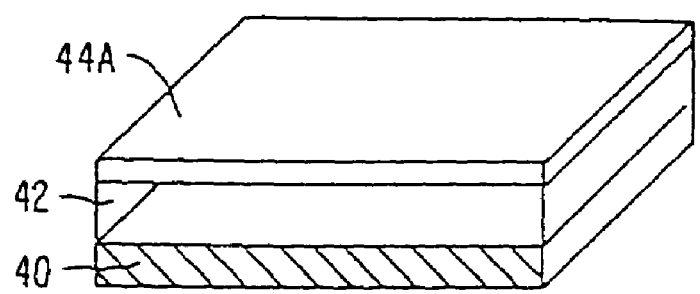
FIG. 11 is an illustration showing a first sacrificial layer deposited on top of the first elastomeric layer of FIG. 10.
Figure 12:
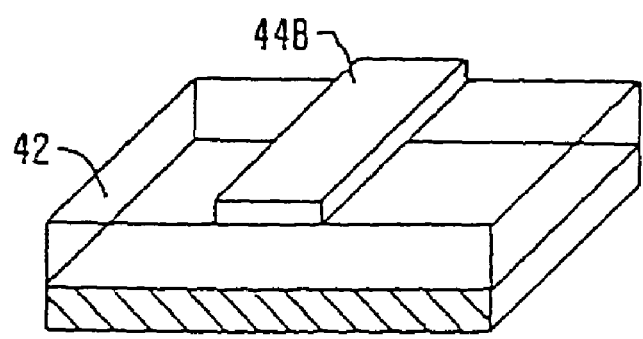
FIG. 12 is an illustration showing the system of FIG. 11, but with a portion of the first sacrificial layer removed, leaving only a first line of sacrificial layer.
Figure 13:
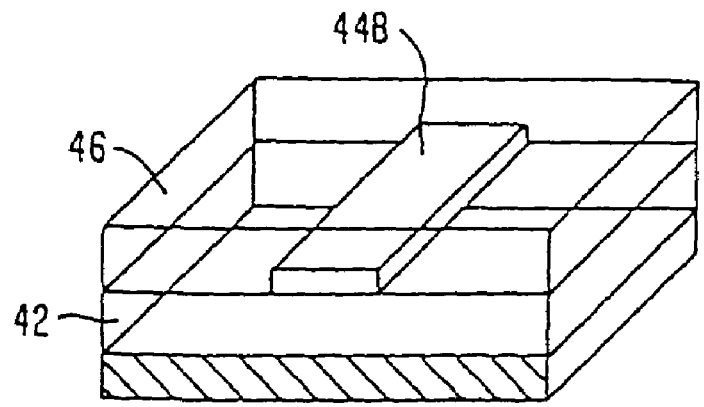
FIG. 13 is an illustration showing a second elastomeric layer applied on top of the first elastomeric layer over the first line of sacrificial layer of FIG. 12, thereby encasing the sacrificial layer between the first and second elastomeric layers.
Figure 14:
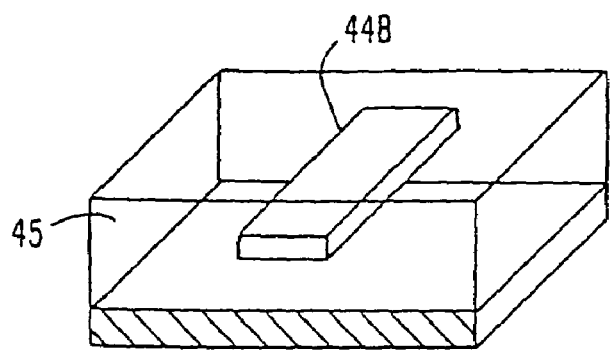
FIG. 14 corresponds to FIG. 13, but shows the integrated monolithic structure produced after the first and second elastomer layers have been bonded together.

Referring first to FIG. 10, a planar substrate 40 is provided. A first elastomeric layer 42 is then deposited and cured on top of planar substrate 40. Referring to FIG. 11, a first sacrificial layer 44A is then deposited over the top of elastomeric layer 42. Referring to FIG. 12, a portion of sacrificial layer 44A is removed such that only a first line of sacrificial layer 44B remains as shown. Referring to FIG. 13, a second elastomeric layer 46 is then deposited over the top of first elastomeric layer 42 and over the first line of sacrificial layer 44B as shown, thereby encasing first line of sacrificial layer 44B between first elastomeric layer 42 and second elastomeric layer 46. Referring to FIG. 14, elastomeric layers 46 is then cured on layer 42 to bond the layers together to form a monolithic elastomeric substrate 45.

Figure 15:
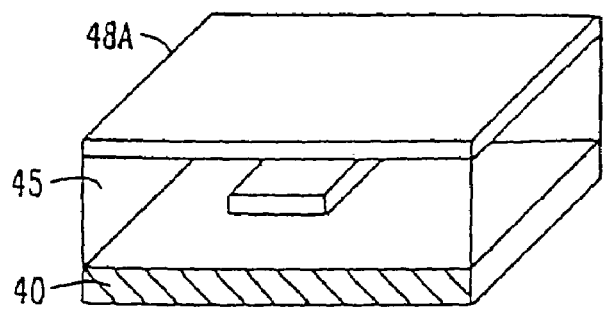
FIG. 15 is an illustration showing a second sacrificial layer deposited on top of the integral elastomeric structure of FIG. 14.
Figure 16:
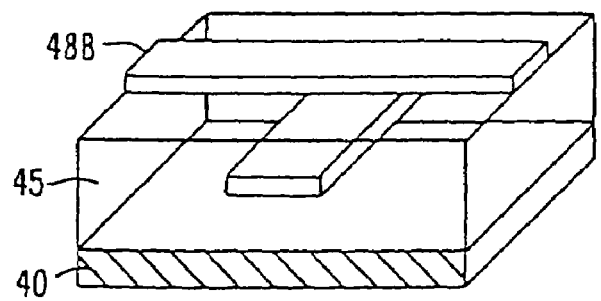
FIG. 16 is an illustration showing the system of FIG. 15, but with a portion of the second sacrificial layer removed, leaving only a second line of sacrificial layer.
Figure 17:
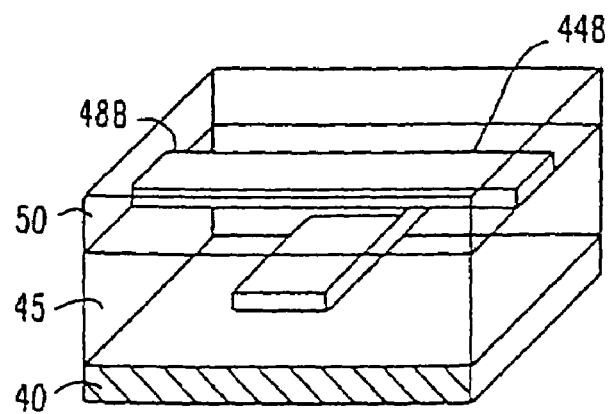
FIG. 17 is an illustration showing a third elastomer layer applied on top of the second elastomeric layer and over the second line of sacrificial layer of FIG. 16, thereby encapsulating the second line of sacrificial layer between the elastomeric structure of FIG. 14 and the third elastomeric layer.

Referring to FIG. 15, a second sacrificial layer 48A is then deposited over elastomeric structure 45. Referring to FIG. 16, a portion of second sacrificial layer 48A is removed, leaving only a second sacrificial layer 48B on top of elastomeric structure 45 as shown. Referring to FIG. 17, a third elastomeric layer 50 is then deposited over the top of elastomeric structure 45 (comprised of second elastomeric layer 42 and first line of sacrificial layer 44B) and second sacrificial layer 48B as shown, thereby encasing the second line of sacrificial layer 48B between elastomeric structure 45 and third elastomeric layer 50.

Figure 18:
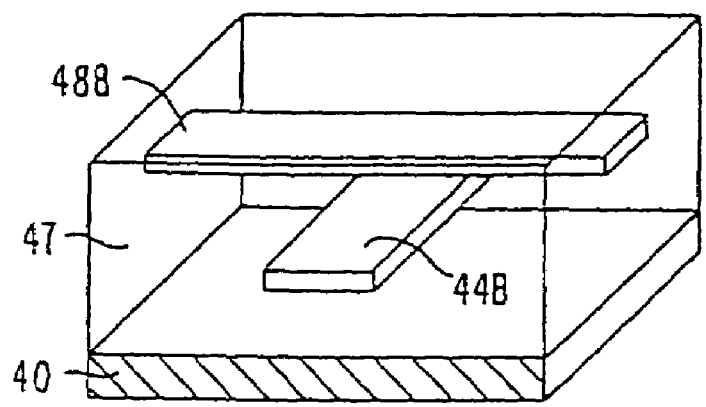
FIG. 18 corresponds to FIG. 17, but shows the third elastomeric layer cured so as to be bonded to the monolithic structure composed of the previously bonded first and second elastomer layers.
Figure 19:
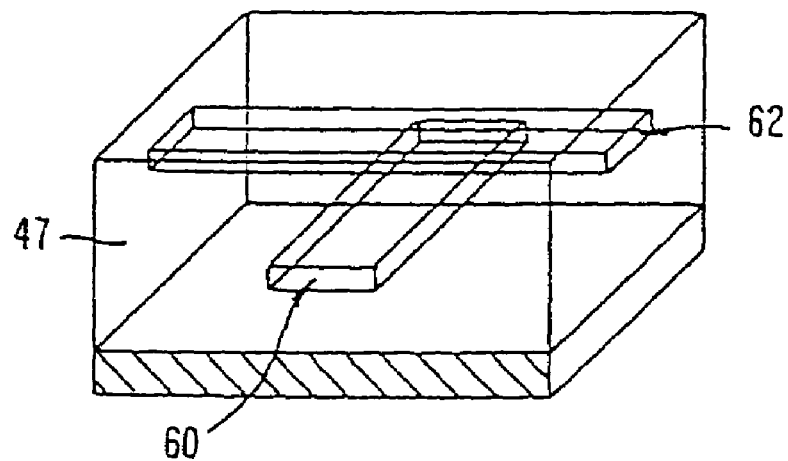
FIG. 19 corresponds to FIG. 18, but shows the first and second lines of sacrificial layer removed so as to provide two perpendicular overlapping, but not intersecting, flow channels passing through the integrated elastomeric structure.
Figure 20:
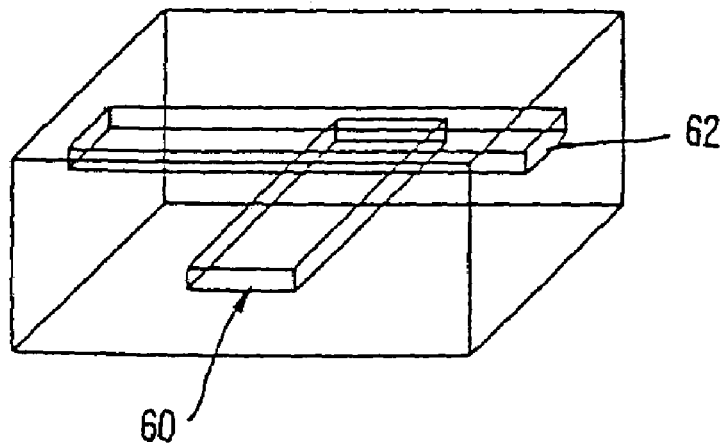
FIG. 20 is an illustration showing the system of FIG. 19, but with the planar substrate thereunder removed.

Referring to FIG. 18, third elastomeric layer 50 and elastomeric structure 45 (comprising first elastomeric layer 42 and second elastomeric layer 46 bonded together) is then bonded together forming a monolithic elastomeric structure 47 having sacrificial layers 44B and 48B passing therethrough as shown. Referring to FIG. 19, sacrificial layers 44B and 48B are then removed (for example, by dissolving in a solvent) such that a first flow channel 60 and a second flow channel 62 are provided in their place, passing through elastomeric structure 47 as shown. Lastly, referring to FIG. 20, planar substrate 40 can be removed from the bottom of the integrated monolithic structure.

Multilayer Construction

Soft lithographic bonding can be used to construct an integrated system which contains multiple fluid flow channels. A heterogenous bonding can be used in which different layers are of different chemistries. For example, the bonding process used to bind respective elastomeric layers together can comprise bonding together two layers of RTV 615 silicone. RTV 615 silicone is a two-part addition-cure silicone rubber. Part A contains vinyl groups and catalyst; part B contains silane (Si—H) groups. The conventional ratio for RTV 615 is 10A:1B. For bonding, one layer can be made with 30A:1B (i.e. excess vinyl groups) and the other with 3A:1B (i.e. excess silane groups). Each layer is cured separately. When the two layers are brought into contact and heated at elevated temperature, they bond irreversibly forming a monolithic elastomeric substrate.

A homogenous bonding can also be used in which all layers are of the same chemistry. For example, elastomeric structures are formed utilizing Sylgard 182, 184 or 186, or aliphatic urethane diacrylates such as (but not limited to) Ebecryl 270 or Irr 245 from UCB Chemical. For example, two-layer elastomeric structures were fabricated from pure acrylated Urethane Ebe 270. A thin bottom layer was spin coated at 8000 rpm for 15 seconds at 170° C. The top and bottom layers were initially cured under ultraviolet light for 10 minutes under nitrogen utilizing a Model ELC 500 device manufactured by Electrolite corporation. The assembled layers were then cured for an additional 30 minutes. Reaction was catalyzed by a 0.5% vol/vol mixture of Irgacure 500 manufactured by Ciba-Geigy Chemicals. The resulting elastomeric material exhibited moderate elasticity and adhesion to glass.

In some applications, two-layer elastomeric structures were fabricated from a combination of 25% Ebe 270/50% Irr245/25% isopropyl alcohol for a thin bottom layer, and pure acrylated Urethane Ebe 270 as a top layer. The thin bottom layer was initially cured for 5 min, and the top layer initially cured for 10 minutes, under ultraviolet light under nitrogen utilizing a Model ELC 500 device manufactured by Electrolite corporation. The assembled layers were then cured for an additional 30 minutes. Reaction was catalyzed by a 0.5% vol/vol mixture of Irgacure 500 manufactured by Ciba-Geigy Chemicals. The resulting elastomeric material exhibited moderate elasticity and adhered to glass.

Where encapsulation of sacrificial layers is employed to fabricate the elastomer structure as described above in FIGS. 10-20, bonding of successive elastomeric layers can be accomplished by pouring uncured elastomer over a previously cured elastomeric layer and any sacrificial material patterned thereupon. Bonding between elastomer layers occurs due to interpenetration and reaction of the polymer chains of an uncured elastomer layer with the polymer chains of a cured elastomer layer. Subsequent curing of the elastomeric layer creates a monolithic elastomeric structure in which a bond is formed between the elastomeric layers.

Referring to the first method of FIGS. 3 to 9B, first elastomeric layer 20 can be created by spin-coating an RTV mixture on microfabricated mold 12 at 2000 rpm for 30 seconds yielding a thickness of approximately 40 microns. Second elastomeric layer 22 can be created by spin-coating an RTV mixture on microfabricated mold 11. Both layers 20 and 22 can be separately baked or cured at about 80° C. for 1.5 hours. The second elastomeric layer 22 can be bonded onto first elastomeric layer 20 at about 80° C. for about 1.5 hours.

Micromachined molds 10 and 12 can be patterned sacrificial layer on silicon wafers. In an exemplary aspect, a Shipley SJR 5740 sacrificial layer was spun at 2000 rpm patterned with a high resolution transparency film as a mask and then developed yielding an inverse channel of approximately 10 microns in height. When baked at approximately 200° C. for about 30 minutes, the sacrificial layer reflows and the inverse channels become rounded. Optionally, the molds can be treated with trimethylchlorosilane (TMCS) vapor for about a minute before each use in order to prevent adhesion of silicone rubber.

Dimensions of the Microfabricated Structures

Some channels (30, 32, 60 and 62) preferably have width-to-depth ratios of about 10:1. A non-exclusive list of other ranges of width-to-depth ratios in accordance with the present invention is 0.1:1 to 100:1, more preferably 1:1 to 50:1, more preferably 2:1 to 20:1, and most preferably 3:1 to 15:1. In an exemplary aspect, channels 30, 32, 60 and 62 have widths of about 1 to about 1000 microns. A non-exclusive list of other ranges of widths of channels in accordance with the present invention is about 0.01 to about 1000 microns, more preferably about 0.05 to about 1000 microns, more preferably about 0.2 to about 500 microns, more preferably about 1 to about 250 microns, and most preferably about 10 to about 200 microns. Exemplary channel widths include 0.1 $\mu$m, 1 $\mu$m, 2 $\mu$m, 5 $\mu$m, 10 $\mu$m, 20 $\mu$m, 30 $\mu$m, 40 $\mu$m, 50 $\mu$m, 60 $\mu$m, 70 $\mu$m, 80 $\mu$m, 90 $\mu$m, 100 $\mu$m, 110 $\mu$m, 120 $\mu$m, 130 $\mu$m, 140 $\mu$m, 150 $\mu$m, 160 $\mu$m, 170 $\mu$m, 180 $\mu$m, 190 $\mu$m, 200 $\mu$m, 210 $\mu$m, 220 $\mu$m, 230 $\mu$m, 240 $\mu$m, and 250 $\mu$m.

Channels 30, 32, 60, and 62 have depths of about 1 to about 100 microns. A non-exclusive list of other ranges of depths of channels in accordance with the present invention is about 0.01 to about 1000 microns, more preferably about 0.05 to about 500 microns, more preferably about 0.2 to about 250 microns, and more preferably about 1 to about 100 microns, more preferably 2 to 20 microns, and most preferably 5 to 10 microns. Exemplary depths include including 0.01 $\mu$m, 0.02 gm, 0.05 $\mu$m, 0.1 gm, 0.2 $\mu$m, 0.5 $\mu$m, 1 $\mu$m, 2 $\mu$m, 3 $\mu$m, 4 $\mu$m, 5 $\mu$m, 7.5 $\mu$m, 10 $\mu$m, 12.5 $\mu$m, 15 $\mu$m, 17.5 $\mu$m, 20 $\mu$m, 22.5 $\mu$m, 25 $\mu$m, 30 $\mu$m, 40 $\mu$m, 50 $\mu$m, 75 $\mu$m, 100 $\mu$m, 150 $\mu$m, 200 gm, and 250 $\mu$m.

The channels are not limited to these specific dimension ranges and examples given above, and can vary in width in order to affect the magnitude of force required to deflect the elastomeric segment. For example, extremely narrow channels having a width on the order of 0.01 $\mu$m can be useful in a variety of applications. Elastomeric structures which include portions having channels of even greater width than described above are also contemplated by the present invention, and examples of applications of utilizing such wider channels include fluid reservoir and mixing channel structures.

Elastomeric layer 22 can be cast thick for mechanical stability. In an exemplary embodiment, layer 22 is about 50 microns to several centimeters thick, and more preferably approximately 4 mm thick. A non-exclusive list of ranges of thickness of the elastomer layer in accordance with other embodiments of the present invention is between about 0.1 micron to about 10 cm, 1 micron to 5 cm, 10 microns to 2 cm, and 100 microns to 10 mm.

Accordingly, elastomeric segment 25 of FIG. 9B separating channels 30 and 32 has a typical thickness of between about 0.01 and about 1000 microns, more preferably about 0.05 to about 500 microns, still more preferably about 0.2 to about 250, yet more preferably about 1 to about 100 microns, still yet more preferably about 2 to about 50 microns, and most preferably about 5 to about 40 microns. As such, the thickness of elastomeric layer 22 is about 100 times the thickness of elastomeric layer 20. Exemplary elastomeric segment thicknesses include 0.01 $\mu$m, 0.02 $\mu$m, 0.03 $\mu$m, 0.05 $\mu$m, 0.1 $\mu$m, 0.2 $\mu$m, 0.3 $\mu$m, 0.5 $\mu$m, 1 $\mu$m, 2 $\mu$m, 3 $\mu$m, 5 $\mu$m, 7.5 $\mu$m, 10 $\mu$m, 12.5 $\mu$m, 15 $\mu$m, 17.5 $\mu$m, 20 $\mu$m, 22.5 $\mu$m, 25 $\mu$m, 30 $\mu$m, 40 $\mu$m, 50 $\mu$m, 75 $\mu$m, 100 $\mu$m, 150 $\mu$m, 200 $\mu$m, 250 $\mu$m, 300 $\mu$m, 400 $\mu$m, 500 $\mu$m, 750 $\mu$m, and 1000 $\mu$m.

Similarly, first elastomeric layer 42 can have a preferred thickness about equal to that of elastomeric layer 20 or 22; second elastomeric layer 46 can have a preferred thickness about equal to that of elastomeric layer 20; and third elastomeric layer 50 can have a preferred thickness about equal to that of elastomeric layer 22.

Operation of the Microfabricated Components

Figure 9C:
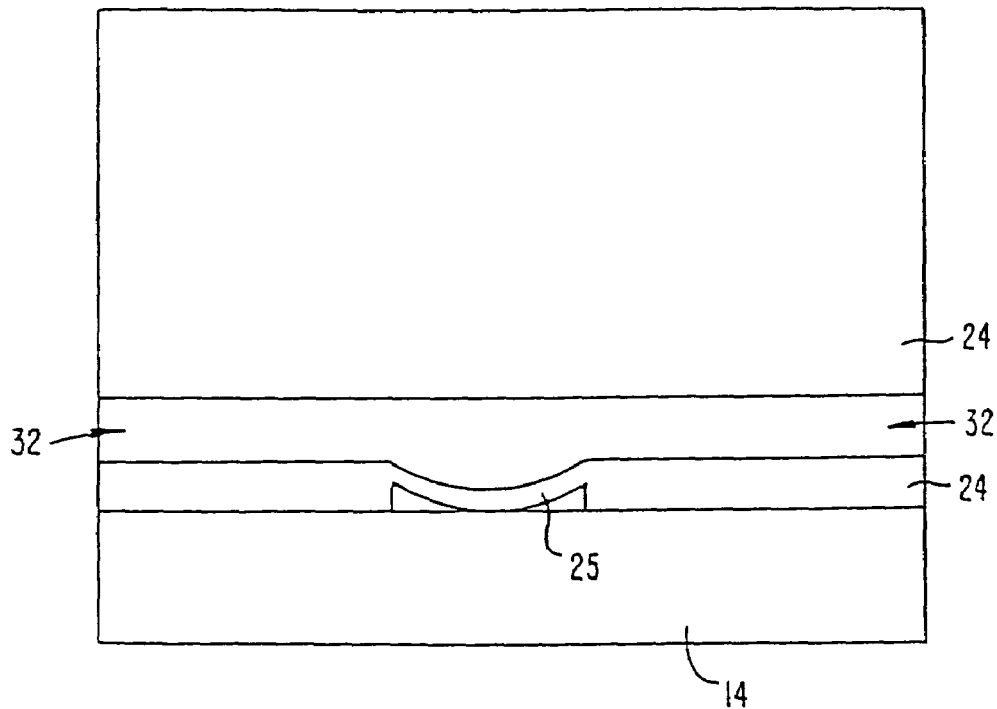
FIG. 9C corresponds to FIG. 9A, but shows a first flow channel closed by pressurization in second flow channel.

FIGS. 9B and 9C together show the closing of a flow channel by pressurizing a control channel. FIG. 9B (a front sectional view cutting through flow channel 32 in corresponding FIG. 9A) shows an open flow channel 30. And FIG. 9C shows flow channel 30 closed by pressurization of the control channel 32.

Referring to FIG. 9B, the flow channel 30 and the control channel 32 are shown. Elastomeric segment 25 separates the channels, forming the top of the flow channel 30 and the bottom of the control channel 32. As can be seen, flow channel 30 is "open".

As can be seen in FIG. 9C, pressurization of control channel 32 (either by gas or liquid introduced therein) causes elastomeric segment 25 to deflect downward, thereby pinching off flow F passing through flow channel 30. Accordingly, by varying the pressure in control channel 32, a linearly actuable valve system is provided such that flow channel 30 can be opened or closed by moving elastomeric segment 25 as desired. (For illustration purposes only, flow channel 30 in FIG. 9C is shown in a "mostly closed" position, rather than a "fully closed" position).

It is to be understood that exactly the same valve opening and closing methods can be achieved with channels 60 and 62. Since such valves are actuated by moving the roof of the channels themselves (i.e., moving elastomeric segment 25), valves and pumps produced by this technique have a truly zero dead volume, and switching valves made by this technique have a dead volume approximately equal to the active volume of the valve, for example, about 100×100×10 $\mu$m=100 pL. Such dead volumes and areas consumed by the moving elastomeric segment are approximately two orders of magnitude smaller than known conventional microvalves. Smaller and larger valves and switching valves are contemplated in the present invention, and a non-exclusive list of ranges of dead volume includes 1 aL to 1 $\mu$L, 100 aL to 100 nL, 1 fL to 10 nL, 100 fL to 1 nL, and 1 pL to 100 pL.

The extremely small volumes capable of being delivered by pumps and valves in accordance with the present invention represent a substantial advantage. Specifically, the smallest known volumes of fluid capable of being manually metered is around 0.1 $\mu$l. The smallest known volumes capable of being metered by automated systems is about ten-times larger (1 µl). Utilizing pumps and valves of the present invention, volumes of liquid of 10 nl or smaller can routinely be metered and dispensed. The accurate metering of extremely small volumes of fluid enabled by the present invention would be extremely valuable in a large number of biological applications, including medical devices, diagnostic tests, sample preparations, sample separations, and sample analysis (i.e., assays).

Figure 21:
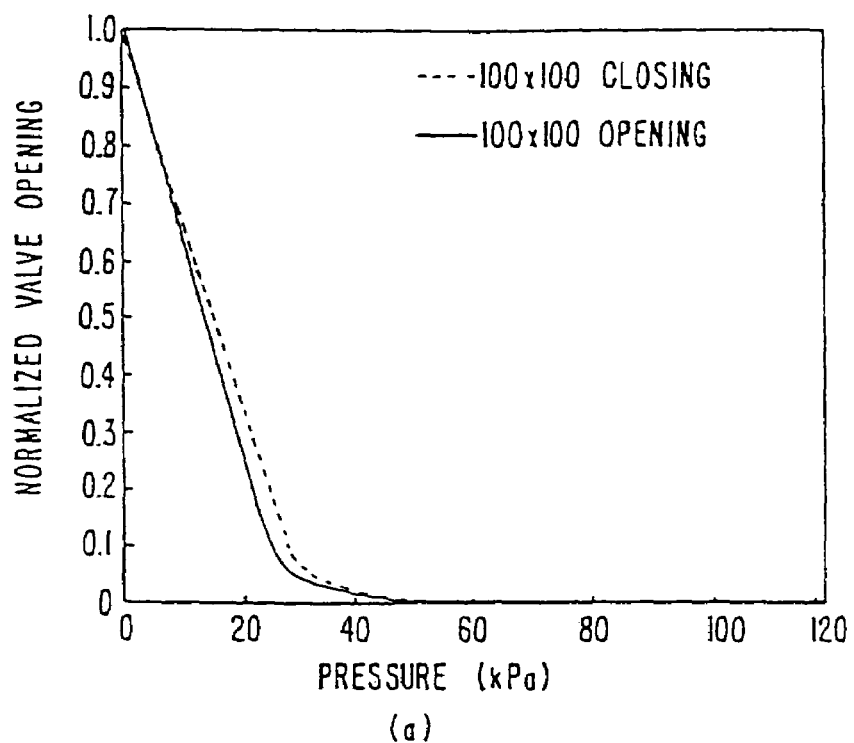
FIGS. 21a and 21b illustrate valve opening vs. applied pressure for various flow channel dimensions.
Figure 21:
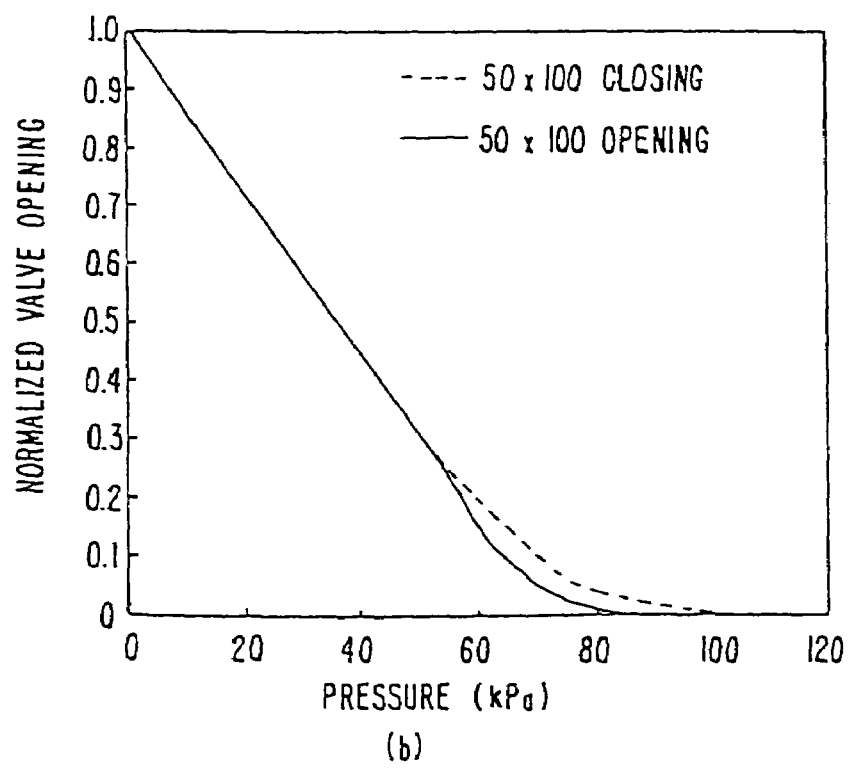

FIGS. 21a and 21b illustrate valve opening vs. applied pressure for a 100 µm wide flow channel 30 and a 50 µm wide control channel 32. The elastomeric segment of this device was formed by a layer of General Electric Silicones RTV 615 having a thickness of approximately 30 µm and a Young's modulus of approximately 750 kPa. FIGS. 21a and 21b show the extent of opening of the valve to be substantially linear over most of the range of applied pressures.

Air pressure was applied to actuate the elastomeric segment of the device through a 10 cm long piece of plastic tubing having an outer diameter of 0.025" connected to a 25 mm piece of stainless steel hypodermic tubing with an outer diameter of 0.025" and an inner diameter of 0.013". This tubing was placed into contact with the control channel by insertion into the elastomeric block in a direction normal to the control channel. Air pressure was applied to the hypodermic tubing from an external LHDA miniature solenoid valve manufactured by Lee Co.

The response of valves of the present invention is substantially linear over a large portion of its range of travel, with minimal hysteresis. While valves and pumps do not require linear actuation to open and close, linear response does allow valves to more easily be used as metering devices. In some applications, the opening of the valve is used to control flow rate by being partially actuated to a known degree of closure. Linear valve actuation makes it easier to determine the amount of actuation force required to close the valve to a desired degree of closure. Another benefit of linear actuation is that the force required for valve actuation can be easily determined from the pressure in the flow channel. If actuation is linear, increased pressure in the flow channel can be countered by adding the same pressure (force per unit area) to the actuated portion of the valve.

Control and Pump Systems

Figure 22A:
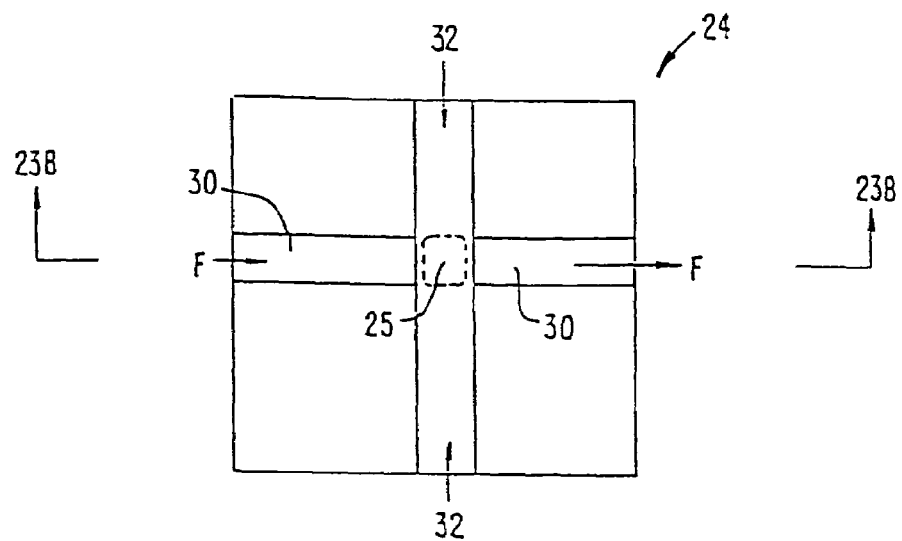
FIG. 22A is a top schematic view of an on/off valve.
Figure 23A:
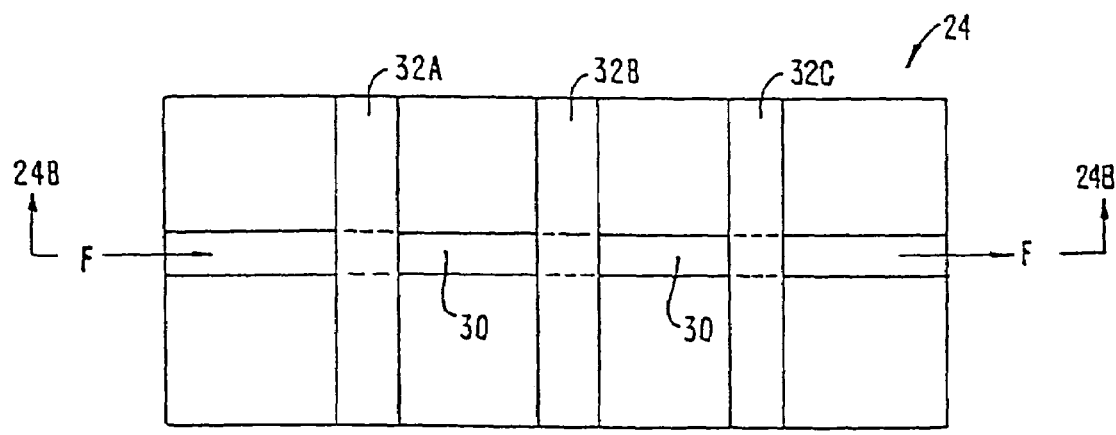
FIG. 23A is a top schematic view of a peristaltic pumping system.
Figure 22B:
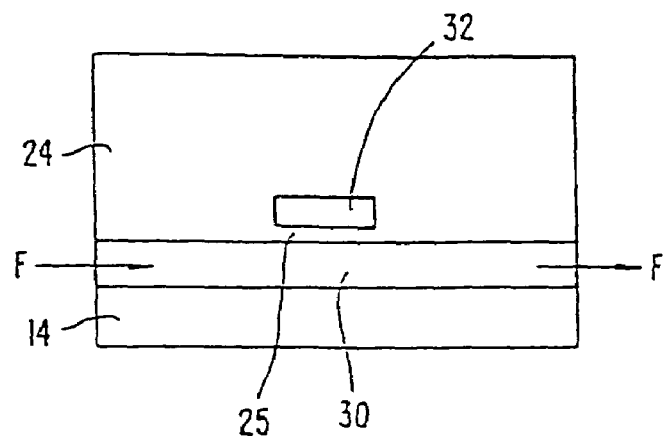
FIG. 22B is a sectional elevation view along line 23B-23B in FIG. 22A

FIGS. 22A and 22B show views of a single on/off valve (e.g., flow control system), identical to the systems set forth above, (for example in FIG. 9A). FIGS. 23A and 21B show a peristaltic pumping system (e.g., a material delivery system) comprised of a plurality of the single addressable on/off valves as seen in FIGS. 22A and 22B, but networked together. FIG. 24 is a graph showing experimentally achieved pumping rates vs. frequency for the peristaltic pumping system of FIGS. 23A and 23B.

Referring first to FIGS. 22A and 22B, a schematic of channels 30 and 32 is shown. Flow channel 30 preferably has a fluid (or gas) flow F passing therethrough. Control channel 32, which crosses over flow channel 30, is pressurized such that elastomeric segment 25 separating the channels is depressed into the path of flow channel 30, shutting off the passage of flow F therethrough, as described above.

Figure 23B:
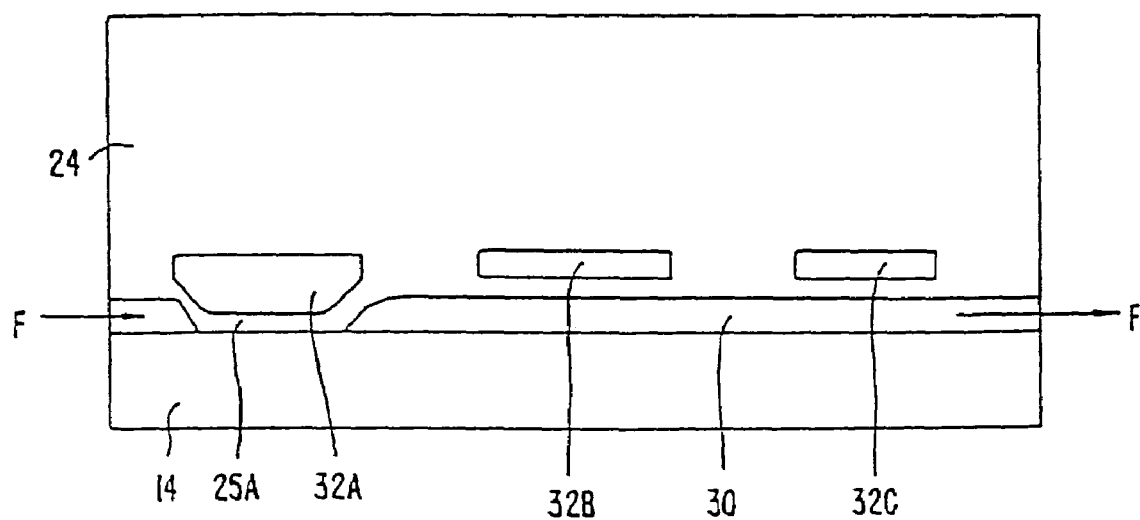
FIG. 23B is a sectional elevation view along line 24B-24B in FIG. 23A
Figure 24:
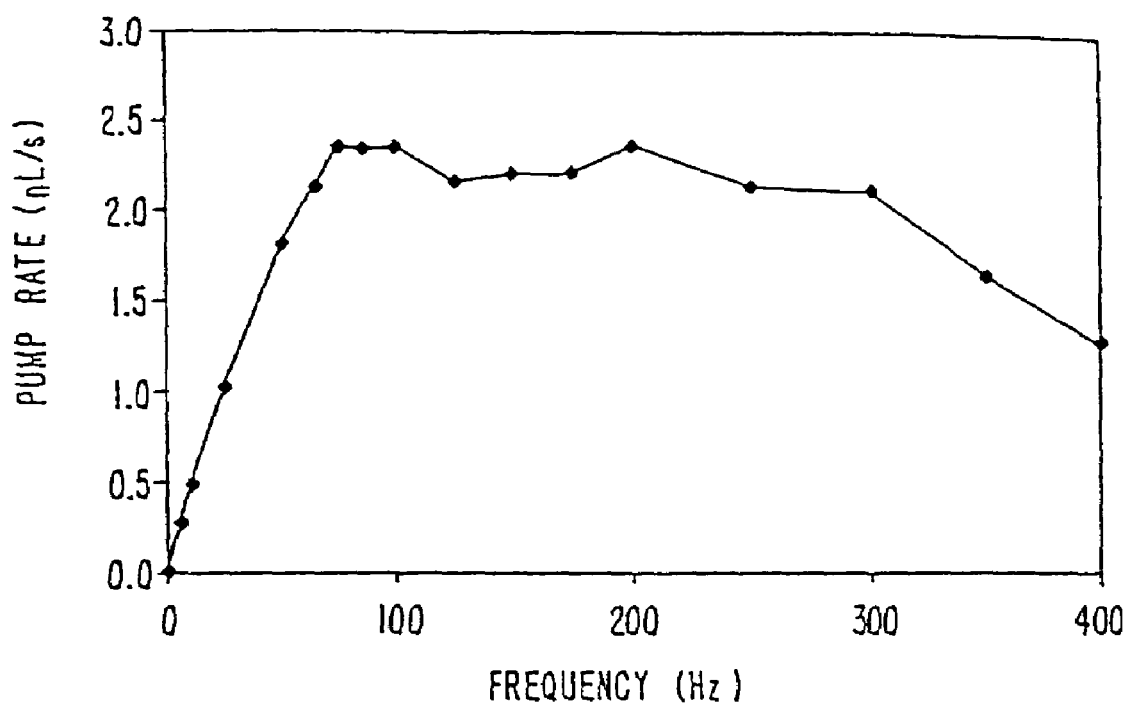
FIG. 24 is a graph showing experimentally achieved pumping rates vs. frequency for an embodiment of the peristaltic pumping system of FIGS. 23A and 23B.

Referring to FIGS. 23A and 23B, a system for peristaltic pumping is provided, as follows. A flow channel 30 has a plurality of generally parallel control channels 32A, 32B and 32C passing thereover. By pressurizing control line 32A, flow F through flow channel 30 is shut off under elastomeric segment 25A at the intersection of control line 32A and flow channel 30. Similarly, (but not shown), by pressurizing control line 32B, flow F through flow channel 30 is shut off under elastomeric segment 25B at the intersection of control line 32B and flow channel 30, etc. Each of control lines 32A, 32B, and 32C is separately addressable. Therefore, peristalsis can be actuated by the pattern of actuating 32A and 32C together, followed by 32A, followed by 32A and 32B together, followed by 32B, followed by 32B and C together, etc. This corresponds to a successive "101, 100, 110, 010, 011, 001" pattern, where "0" indicates "valve open" and "1" indicates "valve closed." This peristaltic pattern is also known as a 120° pattern (referring to the phase angle of actuation between three valves). Other peristaltic patterns are equally possible, including 60° and 90° patterns.

Using this process, a pumping rate of 2.35 nL/s was measured by measuring the distance traveled by a column of water in thin (0.5 mm i.d.) tubing; with 100×100×10 µm valves under an actuation pressure of 40 kPa. As shown in FIG. 24, the pumping rate increased with actuation frequency until approximately at about 75 Hz, and from about 75 Hz to above 200 Hz the pumping rate was nearly constant. The valves and pumps are also quite durable and the elastomeric segment, control channels, or both have not been observed to fail. Moreover, none of the valves in the peristaltic pump described herein shows any sign of wear or fatigue after more than 4 million actuations.

Variations

In some applications, microfluidic devices produced from the surface modified polymer, such as microfluidic chromatography apparatuses, utilize microfluidics based on conventional micro-electro-mechanical system (MEMS) technology. Methods of producing conventional MEMS microfluidic devices, e.g., by bulk micro-machining and surface micro-machining, have been described. See, for example, Terry et al., *A Gas Chromatographic Air Analyzer Fabricated on a Silicon Wafer*, IEEE Trans. on Electron Devices, v. ED-26, pp. 1880-1886, 1979; and Berg et al., *Micro Total Analysis Systems*, New York, Kluwer, 1994, all of which are incorporated herein by reference in their entirety.

Bulk micro-machining is a subtractive fabrication method whereby single crystal silicon is lithographically patterned and then etched to form three-dimensional structures. For example, bulk micromachining technology, which includes the use of glass wafer processing, silicon-to-glass wafer bonding, has been commonly used to fabricate individual microfluidic components. This glass-bonding technology has also been used to fabricate microfluidic devices.

Surface micro-machining is an additive method where layers of semiconductor-type materials such as polysilicon, silicon nitride, silicon dioxide, and various metals are sequentially added and patterned to make three-dimensional structures. Surface micromachining technology can be used to fabricate individual fluidic components as well as microfluidic systems with on-chip electronics. In addition, unlike bonded-type devices, hermetic channels can be built in a relatively simple manner using channel walls made of polysilicon (see, e.g., Webster et al., *Monolithic Capillary Gel Electrophoresis Stage with On-Chip Detector*, in International Conference on Micro Electromechanical Systems, MEMS 96, pp. 491-496, 1996), silicon nitride (see, e.g., Mastrangelo et al., *Vacuum-Sealed Silicon Micromachined Incandescent Light Source*, in Intl. Electron Devices Meeting, IDEM 89, pp. 503-506, 1989), and silicon dioxide.

In some applications, electrokinetic flow based microfluidics can be employed. Briefly, these systems direct fluid flow within an interconnected channel and/or chamber containing structure through the application of electrical fields to the fluid. The electrokinetic systems concomitantly regulate voltage gradients applied across at least two intersecting channels. Such systems are described, e.g., in WO 96/04547 and U.S. Pat. No. 6,107,044.

An exemplary electrokinetic flow based microfluidic device can have a body structure which includes at least two intersecting channels or fluid conduits, e.g., interconnected, enclosed chambers, which channels include at least three unintersected termini. The intersection of two channels refers to a point at which two or more channels are in fluid communication with each other, and encompasses "T" intersections, cross intersections, "wagon wheel" intersections of multiple channels, or any other channel geometry where two or more channels are in such fluid communication. An unintersected terminus of a channel is a point at which a channel terminates not as a result of that channel's intersection with another channel, e.g., "T" intersection.

In some electrokinetic flow based microfluidic devices, at least three intersecting channels having at least four unintersected termini are present. In a basic cross channel structure, where a single horizontal channel is intersected and crossed by a single vertical channel, controlled electrokinetic transport operates to direct reagent flow through the intersection, by providing constraining flows from the other channels at the intersection. Simple electrokinetic flow of this reagent across the intersection could be accomplished by applying a voltage gradient across the length of the horizontal channel, i.e., applying a first voltage to the left terminus of this channel, and a second, lower voltage to the right terminus of this channel, or by allowing the right terminus to float (applying no voltage).

EXAMPLES

Additional objects, advantages, and novel features of this invention will become apparent to those skilled in the art upon examination of the following examples thereof, which are not intended to be limiting.

Example 1

Figure 25:
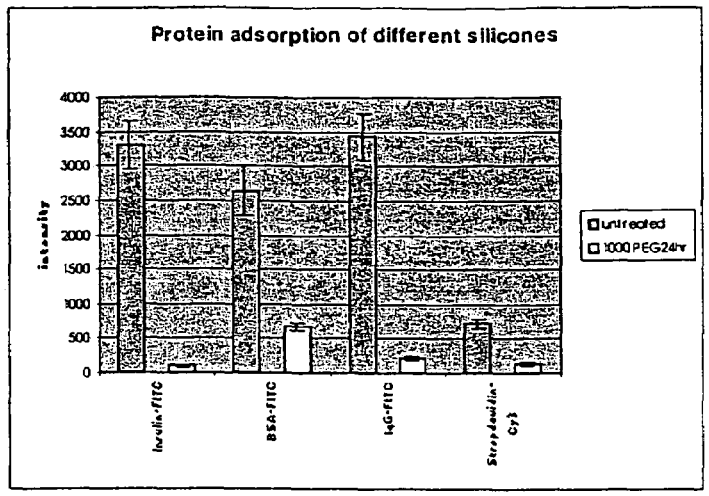
FIG. 25 is a graph showing the PEG-bound surface modified polymer significantly reduces the adsorption of proteins.

A 3:1 (A:B) GE RTV 615 silicone mixture was cured at 80° C. in a convection oven for 3 hrs. The silicone sample was then immersed in a molten PEG sample (molecular weight 1,000, Polysciences, Inc.) at 80° C. for 24 hrs. The surface treated samples were then repeatedly washed with high purity deionized (i.e., DI) water for 2 hrs. The resulting samples were incubated with conjugated protein solutions for 2 hrs at room temperature. The protein solutions used were: insulin-FITC (1 mg/mL), BSA-FITC (1 mg/mL), IgG-FITC (1 mg/mL) and Strepdavidin-Cy3 (0.2 mg/mL). The PEG grafted silicone samples were then washed with DI water gently three times. Fluorescence microscope was used to record the fluorescence intensity of the samples. The settings of the microscope were at such that the intensity is linearly proportional to the amount of the residue protein on the surface. As shown in FIG. 25, results indicate that the PEG treated surface reduces the adsorption of proteins from 95% (insulin-FITC) to about 75% (BSA-FITC).

Example 2

Figure 26:
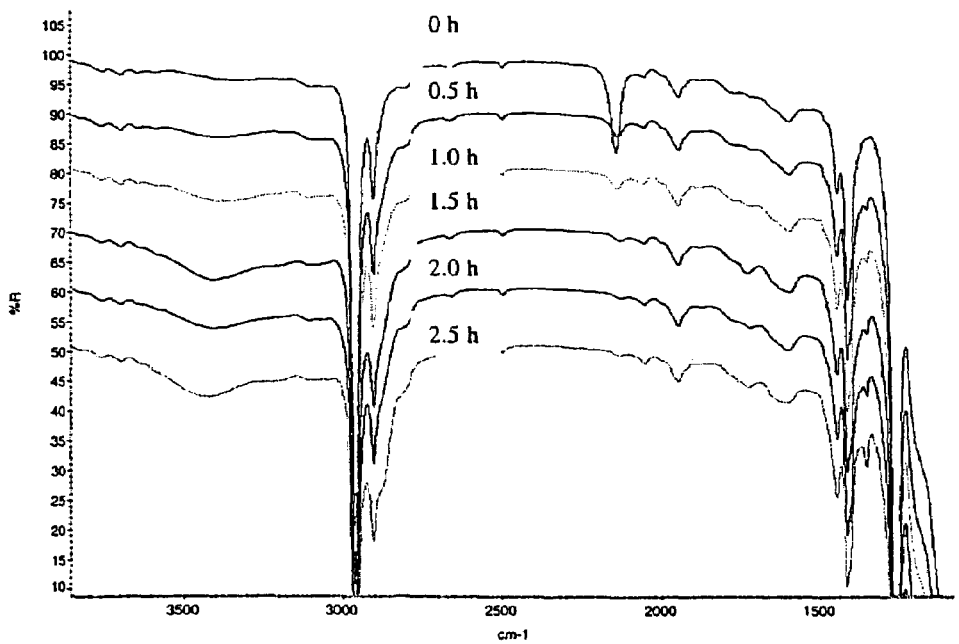
FIG. 26 is an ATR-FTIR spectra of the surfaces of the 4:1 treated PDMS samples of Example 2 as a function of reaction time.

A 4:1 GE RTV silicone mixture was cured at 80° C. in a convection oven for 3 hrs. The excess hydrosilane groups from RTV 615B on the surface were utilized for polyethylene glycol grafting. An allyl-derived PEG, polyoxyethylene mono-allylether $CH_2=CHCH_2O(CH_2CH_2O)_{16}-H$ (AG-160) from Kowa was used for surface grafting. Platinum chloride catalyst, $H_2PtCl_6$ (Sigma-Aldrich), was used to catalyze the hydrosilylation reaction. The catalyst concentration used was in the range of 100~1000 ppm (weight %) and the reaction time at 80° C. ranged from several minutes to hours, depending on the catalyst concentration. As expected, the higher the catalyst concentration, the shorter the reaction time was needed to achieve a desired degree of reaction. The molten AG-160 was used to carry out the reactions. The samples were then washed thoroughly with methanol and DI water in ultrasonic batch. The samples were then dried at 80° C. for 2 hrs. After the cleaning and drying, the top ~1 μm of the PDMS samples were investigated by attenuated total reflection Fourier transfer infrared spectroscopy (ATR-FTIR). FIG. 26 is an ATR-FTIR spectra of the surfaces of the 4:1 treated PDMS samples as a function of reaction time. The IR absorption peak at 2160 $cm^{-1}$ is characteristic of the Si—H functional group and the intensity of this peak is linearly proportional to the concentration of the Si—H group on the top ~1 μm surface of the samples. The hydrosilylation reaction between Si—H and $CH_2=CH$—groups results in a decrease in the absorption intensity of the Si—H peak. As illustrated in FIG. 26, the Si—H peak intensity decreases and disappears with increasing reaction time. This decrease in the Si—H peak shows the conversion of the Si—H functional groups to Si—C bonds that are due to the grafting of AG-160. Additional evidences for the PEG grafting is the peaks at 1330 and 2880 $cm^{-1}$ which is due to the —O—C—H absorption band.

Figure 27:
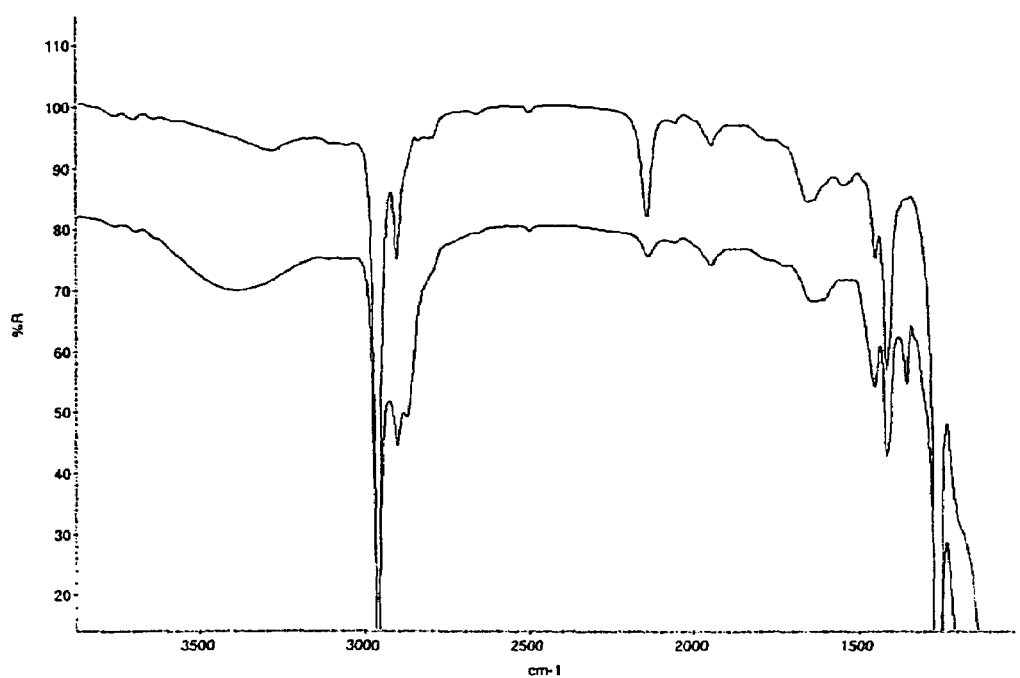
FIG. 27 is an ATR-FTIR spectra of protein (fibrinogen) adsorption behavior on 4:1 PDMS and AG-160-grafted 4:1 PDMS surfaces of Example 2.

ATR-FTIR was also used to study protein absorption behavior of PEG grafted PDMS surfaces. The PDMS samples were incubated with 0.15 mg/mL fibrinogen in PBS (1×) solution for 24 h. The samples were then washed with DI water and then dried. FIG. 27 shows an ATR-FTIR spectra of protein (fibrinogen) adsorption behavior on 4:1 PDMS and AG-160-grafted 4:1 PDMS surfaces. The most characteristic IR peaks for proteins are amide I (~1645 $cm^{-1}$) and amide II (~1550 $cm^{-1}$). Since either PDMS or PEG has absorption peaks in these regions, they can be used for quantitative estimation of proteins adsorbed on the surface. It is clear from the spectra that there is less protein adsorbed on the PEG (AG-160) grafted surface.

Example 3

Figure 28:
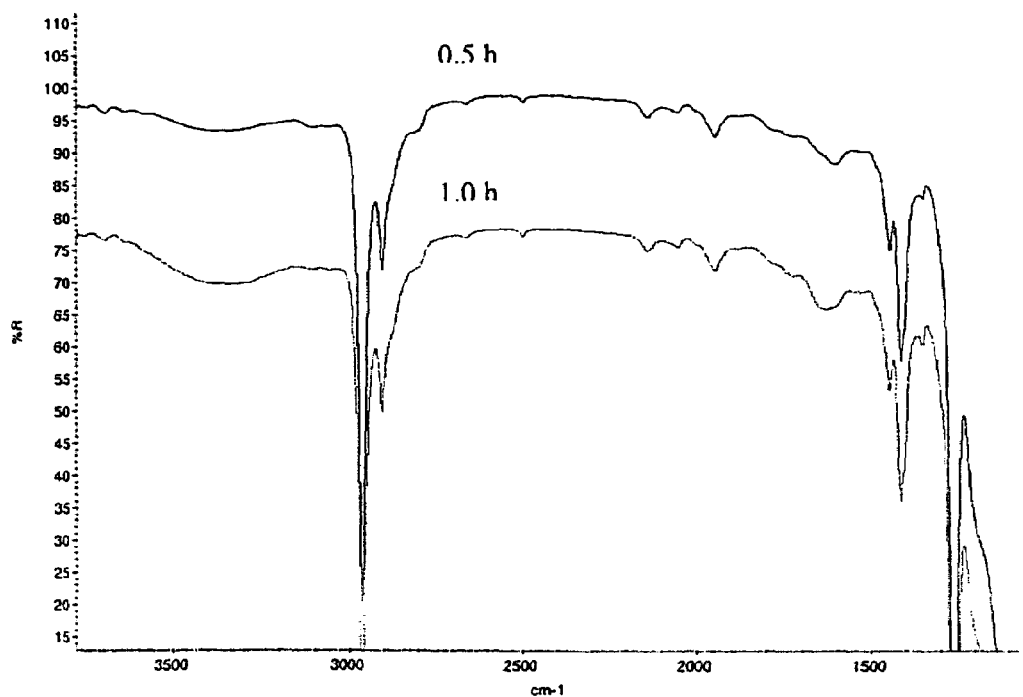
FIG. 28 is an ATR-FTIR spectra of the PDMS samples with PEG grafting reactions carried out in water solution of Example 3.

A 4:1 GE RTV 615 silicone mixture was cured at 80° C. in a convection oven for 3 hrs. The excess hydrosilane groups from RTV 615B on the surface were utilized for polyethylene glycol grafting. Allyl-derived PEG, polyoxyethylene mono-allylether $CH_2=CHCH_2O(CH_2CH_2O)_{16}-H$ (AG-160) from Kowa was used for surface grafting. The catalyst concentration is in the range of 100~1000 ppm (weight %) and the reaction time at 80° C. was from several minutes to several hours. Aqueous AG-160 solution (10 wt % of AG-160) was used to carry out the grafting reactions. FIG. 28 is an ATR-FTIR spectra of the PDMS samples with PEG grafting reactions carried out in water solution. The reaction trend is very similar to that of Example 1, but higher intensity of hydroxyl groups was observed at around 3400 $cm^{-1}$. This may indicate the hydrolysis of surface siloxane groups.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A polymer article comprising:
a plurality of bulk polymer layers that includes a first polymer layer formed from a first silicone elastomer having a first functional group, and a second layer formed from a second silicone elastomer having a second-functional group, wherein the first and second functional groups are complementary functional groups that react to form a covalent bond,
wherein the first reactive functional group is contributed by a polymer used to prepare the first silicone elastomer, and the second reactive-functional group is contributed by a crosslinking agent used to prepare the second silicone elastomer, wherein the first and second silicone elastomers are derived from the same polymer and crosslinking agent, with the first elastomer having an excess of the group contributed by the polymer and the second elastomer having an excess of the group contributed by the crosslinking agent, and
wherein the two polymer layers are covalently bonded together through the reaction of the complementary functional groups in each of the layers.

2. The polymer article of claim 1, wherein the first and second reactive functional groups are selected from the group consisting of an olefin group, a silane group, a hydroxyl group, an isocynate group, and epoxy group, and an amine group.

3. The polymer article of claim 1, wherein the first and second polymers comprise poly(dimethylsiloxane) units.

4. The polymer article of claim 1 wherein the first polymer that is a precursor for the first elastomer has a vinylsiloxane unit and the crosslinking agent that is a precursor for the second elastomer has a hydrogensiloxane unit.

5. The polymer article of claim 4 wherein the first polymer is poly(dimethylsiloxane-co-vinylmethylsiloxane and the crosslinking agent is poly(dimethylsiloxane-co-methylhydrogensiloxane).

6. The polymer article of claim 1, wherein the first elastomer layer comprises a channel extending from an exterior surface of the first layer and into a bulk polymer matrix of the first layer, wherein the channel defines an inner surface that includes the first reaction functional group.

7. The polymer article of claim 6, wherein a surface modifying compound is covalently bound to the first reactive functional groups on the inner surface of the channel.

8. The polymer article of claim 6, wherein the surface modifying compound is a biocompatible compound.

9. The polymer article of claim 6, wherein the surface modifying compound is selected from the group consisting of polyethylene glycol, poly(methyl methacrylate), poly(ethylene vinyl acetate), poly (2-hydroxyethyl methacrylate), polyvinylpyrrolidone, CH2=CH—PEG, and CH2=CH—(CH2)n-poly(tetrafluoroethylene).

10. A polymer article comprising:
a plurality of layers of bulk polymer material, wherein the bulk polymer material comprises reactive functional groups dispersed therein, wherein at least two of the plurality of layers of the bulk polymer material are comprised of different polymer materials, and wherein at least one of the plurality of layers of the bulk polymer matrix comprises a silicone elastomer;
an exterior surface;
a channel extending from an exterior surface of the bulk polymer matrix through the bulk polymer matrix, the channel defining an inner surface; and,
a surface-modifying compound that is covalently bonded to the bulk polymer matrix by reaction with reactive functional groups dispersed along the interior surface of the channel, wherein an interface between two of the layers is formed by covalent bonding through polymerization of complementary reactive functional groups of the two layers.

11. The polymer article of claim 10, wherein the silicone elastomer is derived from a polymer comprising a poly(dimethylsiloxane) unit.

12. The polymer article of claim 11 wherein the silicone elastomer is derived from a polymer comprising a dimethylsiloxane unit and at least one other siloxane monomer unit.

13. The polymer article of claim 12, where the at least one other siloxane unit is a vinylsiloxane unit or a hydrogensiloxane unit.

14. The polymer article of claim 12, wherein the silicone elastomer is derived from a polymer containing a dimethylsiloxane unit, a second siloxane monomer unit having a reactive group, and a crosslinking agent containing a moiety that is chemically complimentary to the second siloxane unit of the polymer.

15. The polymer article of claim 14 wherein the ratio of reactive of the reactive groups contributed by the second siloxane monomer unit to the complimentary group of the crosslinking agent is greater than 10 to 1.

16. A method of making a polymer article, the method comprising:
forming a first polymer layer from a silicone elastomer derived from a first silicone polymer having a first reactive functional group and a crosslinking agent having a second reactive functional group, wherein the number of the first reactive groups is more than the number of the second reactive groups;
forming a second polymer layer derived from the same polymer having a first reactive functional group and crosslinking agent having a second reactive functional group wherein the number of second reactive groups is more than the number of first reactive groups; and
contacting opposing surfaces of the first and second polymer layers, wherein at least a portion of the first reactive groups in the first polymer layer form a covalent bond with at least a portion of the second reactive functional groups in the second polymer layer.

17. The method of claim 16 wherein the first silicone polymer contains a vinylsiloxane unit and the crosslinking agent contains a hydrogensiloxane unit.

18. The method of claim 16, wherein the first reactive functional group is an olefin group and the second reactive functional group is a silicon-bound hydrogen group.

19. The method of claim 17, wherein, in the first polymer layer, the number of the first reactive groups exceeds the number of the second reactive group by a ratio of 10 to 1 or higher.

20. The method of claim 17, wherein, in the second polymer layer, the number of the second reactive groups exceeds the number of the first reactive group by a ratio of 10 to 1 or higher.

21. The method of claim 16, wherein the method comprises forming a channel in the first polymer layer that extends from an exterior surface of the first layer and into a bulk polymer matrix of the first layer, wherein the channel defines an inner surface that includes the first reaction functional group.

22. The method of claim 21, wherein the method comprises contacting the first reactive functional groups on the inner surface of the channel with a surface modifying compound, wherein the surface modifying compound becomes covalently bound to the inner surface of the channel.

23. The method of claim 22, wherein the surface modifying compound is a biocompatible compound.

24. The method of claim 22, wherein the surface modifying compound is selected from the group consisting of polyethylene glycol, poly(methyl methacrylate), poly (ethylene vinyl acetate), poly (2-hydroxyethyl methacrylate), polyvinylpyrrolidone, $CH_2$=CH—PEG, and $CH_2$=CH—$(CH_2)_n$-poly(tetrafluoroethylene).

* * * * *